US008842169B2

(12) United States Patent
Choi et al.

(10) Patent No.: US 8,842,169 B2
(45) Date of Patent: Sep. 23, 2014

(54) DISPLAY APPARATUS WHICH DISPLAYS A PLURALITY OF CONTENT VIEWS, GLASSES APPARATUS WHICH SYNCHRONIZES WITH ONE OF THE CONTENT VIEWS, AND METHODS THEREOF

(71) Applicant: Samsung Electronics Co., Ltd., Suwon-si (KR)

(72) Inventors: Nak-won Choi, Gwangmyeong-si (KR); Je-hwan Seo, Daegu (KR); Kwan-sik Min, Gunpo-si (KR); Jung-jin Park, Seongnam-si (KR); Geun-sam Yang, Suwon-si (KR); Seung-bok Lee, Suwon-si (KR); Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/732,756

(22) Filed: Jan. 2, 2013

(65) Prior Publication Data

US 2014/0036044 A1 Feb. 6, 2014

(30) Foreign Application Priority Data

Aug. 3, 2012 (KR) .................. 10-2012-0085290
Nov. 27, 2012 (KR) .................. 10-2012-0134942

(51) Int. Cl.
*H04N 13/04* (2006.01)
*G06F 15/16* (2006.01)

(52) U.S. Cl.
CPC .... *H04N 13/0429* (2013.01); *H04N 2013/0463* (2013.01); *H04N 13/0438* (2013.01); *H04N 2013/0465* (2013.01); *H04N 2213/008* (2013.01)
USPC ............................................ 348/51; 345/502

(58) Field of Classification Search
USPC ........................................................ 348/51
See application file for complete search history.

(56) References Cited

U.S. PATENT DOCUMENTS 6,188,442 B1  2/2001 Narayanaswami
2006/0153405 A1* 7/2006 Myers .......................... 381/107

(Continued)

FOREIGN PATENT DOCUMENTS

EP  2 169 967 A2  3/2010
EP  2 378 785 A2  10/2011

(Continued)

OTHER PUBLICATIONS

Communication dated Mar. 8, 2013 from the Korean Intellectual Property Office in a counterpart application No. 10-2012-0134942.

(Continued)

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

A display apparatus is provided. The display apparatus includes: a video processor which, in a multi-view mode, processes a plurality of contents and generates a plurality of content views, a display which displays the plurality of content views, a sync signal generator which generates a sync signal regarding the plurality of content views, a communicator which transmits the sync signal, and a controller which, upon communicating with a glasses apparatus, transmits information on a target content view which is controllable from among the plurality of content views to the glasses apparatus. Accordingly, a newly-connected glasses apparatus may be directly synchronized with a target content view.

27 Claims, 22 Drawing Sheets

(56) References Cited

U.S. PATENT DOCUMENTS

| | | | |
|---|---|---|---|
| 2007/0263003 A1* | 11/2007 | Ko et al. ................... | 345/502 |
| 2010/0295929 A1* | 11/2010 | Yoshifuji et al. ........... | 348/53 |
| 2011/0157326 A1* | 6/2011 | Karaoguz et al. ........... | 348/51 |
| 2011/0157327 A1* | 6/2011 | Seshadri et al. ............ | 348/51 |
| 2011/0159929 A1* | 6/2011 | Karaoguz et al. ........... | 455/566 |
| 2011/0159959 A1* | 6/2011 | Mallinson et al. ........... | 463/37 |
| 2011/0161843 A1* | 6/2011 | Bennett et al. ............. | 715/760 |
| 2011/0164034 A1* | 7/2011 | Bennett et al. ............. | 345/419 |
| 2011/0164115 A1* | 7/2011 | Bennett et al. ............. | 348/46 |
| 2011/0169919 A1* | 7/2011 | Karaoguz et al. ........... | 348/46 |
| 2011/0205345 A1* | 8/2011 | Choi et al. ................ | 348/56 |
| 2011/0254931 A1* | 10/2011 | Lee et al. ................. | 348/53 |
| 2011/0254934 A1* | 10/2011 | Yoon et al. ................ | 348/56 |
| 2011/0285829 A1 | 11/2011 | Mori et al. | |
| 2011/0310235 A1* | 12/2011 | Sasaki et al. .............. | 348/54 |
| 2012/0004919 A1* | 1/2012 | Muth ...................... | 704/500 |
| 2012/0038823 A1 | 2/2012 | Chien et al. | |
| 2012/0050509 A1* | 3/2012 | Suzuki ..................... | 348/56 |
| 2012/0081527 A1* | 4/2012 | Richardson et al. .......... | 348/56 |
| 2012/0242811 A1* | 9/2012 | Cho et al. ................. | 348/56 |
| 2013/0169765 A1* | 7/2013 | Park et al. ................ | 348/54 |
| 2014/0022361 A1* | 1/2014 | Yoshifuji et al. ........... | 348/56 |

FOREIGN PATENT DOCUMENTS

| | | |
|---|---|---|
| EP | 2 385 706 A1 | 11/2011 |
| EP | 2 391 134 A1 | 11/2011 |
| EP | 2 429 205 A2 | 3/2012 |
| EP | 2 472 886 A2 | 7/2012 |
| EP | 2 536 155 A2 | 12/2012 |
| JP | 2008-97571 A | 4/2008 |
| JP | 2011-151458 A | 8/2011 |
| JP | 2011-229146 A | 11/2011 |
| JP | 2011-244318 A | 12/2011 |
| JP | 2013-140363 A | 7/2013 |
| KR | 10-2011-0082380 A | 7/2011 |
| KR | 10-2011-0086415 A | 7/2011 |
| KR | 10-2011-0115806 A | 10/2011 |
| WO | 2011/099780 A2 | 8/2011 |

OTHER PUBLICATIONS

Communication from the European Patent Office issued Apr. 12, 2013 in counterpart European Application No. 12199727.4.

International Search Report for PCT/KR2012/010740 dated Apr. 26, 2013 [PCT/ISA/210], English.

Written Opinion for PCT/KR2012/010740 dated Apr. 26, 2013 [PCT/ISA/237], English.

Communication dated Dec. 9, 2013 issued by the European Patent Office in counterpart European Patent Application No. 12199727.4.

Communication dated Mar. 18, 2014 issued by the Japanese Patent Office in counterpart Japanese Patent Application No. 2013-005835.

\* cited by examiner

DISPLAY APPARATUS WHICH DISPLAYS A PLURALITY OF CONTENT VIEWS, GLASSES APPARATUS WHICH SYNCHRONIZES WITH ONE OF THE CONTENT VIEWS, AND METHODS THEREOF

CROSS-REFERENCE TO RELATED APPLICATION

This application claims priority from Korean Patent Applications No. 10-2012-0085290, filed on Aug. 3, 2012 and No. 10-2012-0134942, filed on Nov. 27, 2012 in the Korean Intellectual Property Office, the disclosure of which is incorporated herein by reference in its entirety.

BACKGROUND

1. Field

Methods and apparatuses consistent with exemplary embodiments relate to a display apparatus and a glasses apparatus which is paired (i.e. interlocked) with the display apparatus, and methods thereof, and more particularly, to a display apparatus which displays a plurality of content views and a glasses apparatus which is synchronized with one of the content views and is driven, and methods thereof.

2. Description of the Related Art

Various types of display apparatuses including a television, a mobile phone, a personal computer (PC), a laptop PC, and a personal digital assistant (PDA) are being widely used in general households.

As display apparatuses are increasingly used, the need more diverse functions is also increasing.

A multi-view display apparatus refers to a display apparatus that provides a multi-view function which provides a plurality of content views generated using different contents. A multi-view display apparatus allows a plurality of users to view a plurality of content views using a single multi-view display apparatus without interfering with one another. Unlike in a related-art picture in picture (PIP) function, a multi-view display apparatus alternatively displays content views having the same size.

In order to view a content view that a user wishes to view using the multi-view function, the user uses a glasses apparatus corresponding to the multi-view display apparatus. The glasses apparatus may be divided into a shutter glasses type or a polarized glasses type according to a type of the multi-view display apparatus.

If a new user wearing a new glasses apparatus wishes to view a content view using the multi-view display apparatus, the new glasses apparatus may be operated in synchronization with one content view which is arbitrarily set from among a plurality of content views. Therefore, the user who wears the new glasses apparatus has difficulty in recognizing what content view he/she is viewing while wearing the glasses apparatus. Also, an issue arises regarding how the new user changes the content view he/she is viewing.

Therefore, in a multi-view display apparatus providing a plurality of content views, there is a demand for a technology for allowing a user who wears a new glasses apparatus to easily select a content view.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which provides a multi-view function for a user who wears a new glasses apparatus to use a content view easily, a glasses apparatus which is paired (i.e. interlocked) with the display apparatus, and methods thereof.

A display apparatus according to an exemplary embodiment includes a video processor which, in a multi-view mode, processes a plurality of contents and generates a plurality of content views, a display which displays the plurality of content views, a sync signal generator which generates a sync signal regarding the plurality of content views, a communicator which transmits the sync signal, and a controller which, if a communication connection with a glasses apparatus is established, transmits information on a target content view which is controllable from among the plurality of content views to the glasses apparatus.

The display apparatus may further include an on-screen display (OSD) processor which displays an OSD message informing a connection state of the glasses apparatus on the target content view and a remote control signal receiver which receives a remote control signal, and the controller may process the target content view according to the remote control signal.

The display apparatus may further include an audio processor which generates a plurality of audio signals corresponding to the plurality of content views and an audio signal outputter which outputs the plurality of audio signals through different channels, and the controller may equally set a volume level of the plurality of audio signals as a default value.

The communicator may transmit address information of the display apparatus in response to a pairing trigger signal received from the glasses apparatus and transmit information on the target content view to the glasses apparatus if a response signal corresponding to the address information is received from the glasses apparatus.

The display apparatus may further include a storage which stores information on each of the contents which are displayed on the plurality of content views, and if the multi-view mode is executed after having been terminated, the controller may select the contents again using the information stored in the storage from the previously executed multi-view mode, and controls the video processor to process the selected contents and provide the plurality of content views.

A glasses apparatus which is paired with a display apparatus which displays a plurality of content views according to an exemplary embodiment includes first and second shutter glasses, a shutter glasses driver which independently drives each of the first and the second shutter glasses, a communicator which, if a communication connection with the display apparatus is established, receives a sync signal including synchronization information on each of the plurality of content views and information on a target content view, and a controller which selects synchronization information corresponding to a target content view from among the plurality of content views according to the information on the target content view and controls the shutter glasses driver to drive the first and the second shutter glasses using the selected synchronization information.

The glasses apparatus may further include an audio signal receiver which receives an audio signal corresponding to a content view synchronized with the glasses apparatus from among a plurality of audio signals output from the display apparatus, an audio signal processor which processes the received audio signal and detects audio data, and an audio outputter which outputs the audio data.

The glasses apparatus may include an input receiver which receives a user command and a storage, and the controller may control the audio outputter to control a volume of the audio data in response to a volume control command input through the input receiver, and store a final volume information in the storage and performs a turn-off operation in response to a turn off command input through the input receiver.

The controller may control the communicator to re-connect communication with the display apparatus and control the audio outputter to control an output volume of the audio data based on the final volume information stored in the storage in response to a turn on command input through the input receiver.

The controller may control the audio outputter to control the volume of the audio data according to a volume level which is set as a default value in the display apparatus.

The controller may control the communicator to transmit a pairing trigger signal to the display apparatus in response to a pairing command input through the input receiver, store address information received from the display apparatus in the storage, and control the communicator to communicate with the display apparatus using the address information.

If the display apparatus is turned on after having been turned off, the controller may control the communicator to reconnect communication with the display apparatus using the address information stored in the storage.

A multi-view display method of a display apparatus according to an exemplary embodiment includes displaying a plurality of content views, determining a target content view from among the plurality of content views, and transmitting information on the target content view to the glasses apparatus to synchronize the glasses apparatus with the target content view.

The method may further include, if communication between the glasses apparatus and the display apparatus is connected, displaying an on-screen display (OSD) message informing a connection status of the glasses apparatus on the target content view.

The method may further include generating a plurality of audio signals corresponding to the plurality of content views and outputting the plurality of audio signals through different channels, and a volume level of the plurality of audio signals may be equally set as a default value.

The plurality of content views may be selected based on information stored during a previous multi-view mode.

A method for driving a glasses apparatus which comprises first and second shutter glasses according to an exemplary embodiment includes communicating with a display apparatus which displays a plurality of content views, receiving a sync signal including synchronization information on each of the plurality of content views and information on a target content view, selecting synchronization information corresponding to a target content view from among the plurality of content views according to the information on the target content view, and driving the first and the second shutter glasses using the selected synchronization information.

The method may further include receiving an audio signal corresponding to a target content view synchronized with the glasses apparatus from among a plurality of audio signals output from the display apparatus, processing the received audio signal and detecting audio data, and outputting the audio data.

The method may further include controlling a volume of the audio data in response to a volume control command, storing final volume information and performing a turn-off operation in response to a turn off command, reconnecting communication with the display apparatus using pre-stored address information in response to a turn on command, and controlling an output volume of the audio data based on the stored final volume information.

The method may further include controlling the volume of the audio data according to a volume level which is set as a default value in the display apparatus.

The communicating with the display apparatus may include transmitting a pairing trigger signal to the display apparatus in response to a pairing command, storing address information received from the display apparatus, and transmitting a response signal to the display apparatus using the address information.

According to various exemplary embodiments described above, if a new glasses apparatus is connected to the display apparatus, the new glasses apparatus can easily grasp information on the display apparatus and can be used easily. Accordingly, user's convenience is greatly improved.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
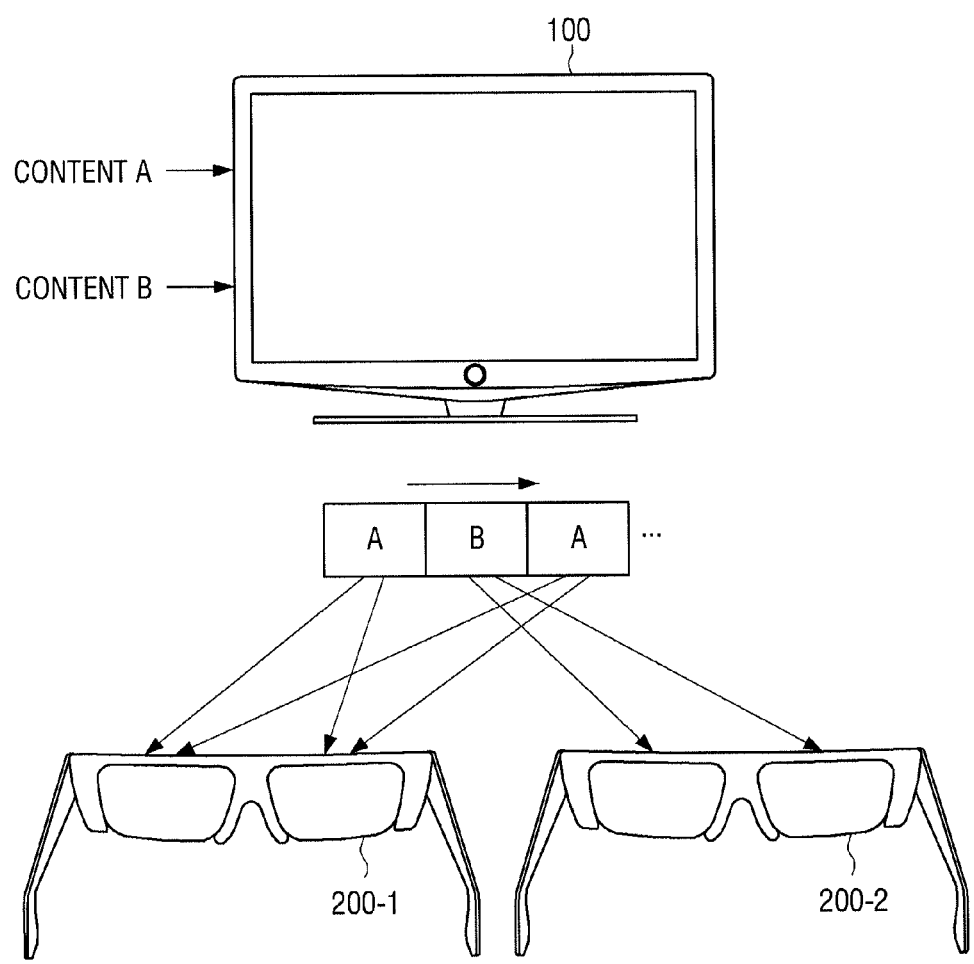
FIG. 1 is a view illustrating a display apparatus which provides a multi-view function using two 2D contents according to an exemplary embodiment.

Hereinafter, exemplary embodiments will be described in greater detail with reference to the accompanying drawings.

Features described in the following description are provided to assist in an understanding of exemplary embodiments. Thus, it is apparent that exemplary embodiments can be carried out without those specifically defined matters. Functions and or elements known in the related art are not described in detail since they would obscure the exemplary embodiments with unnecessary detail and same reference numerals are used for the same elements when they are depicted in different drawings.

Figure 2:
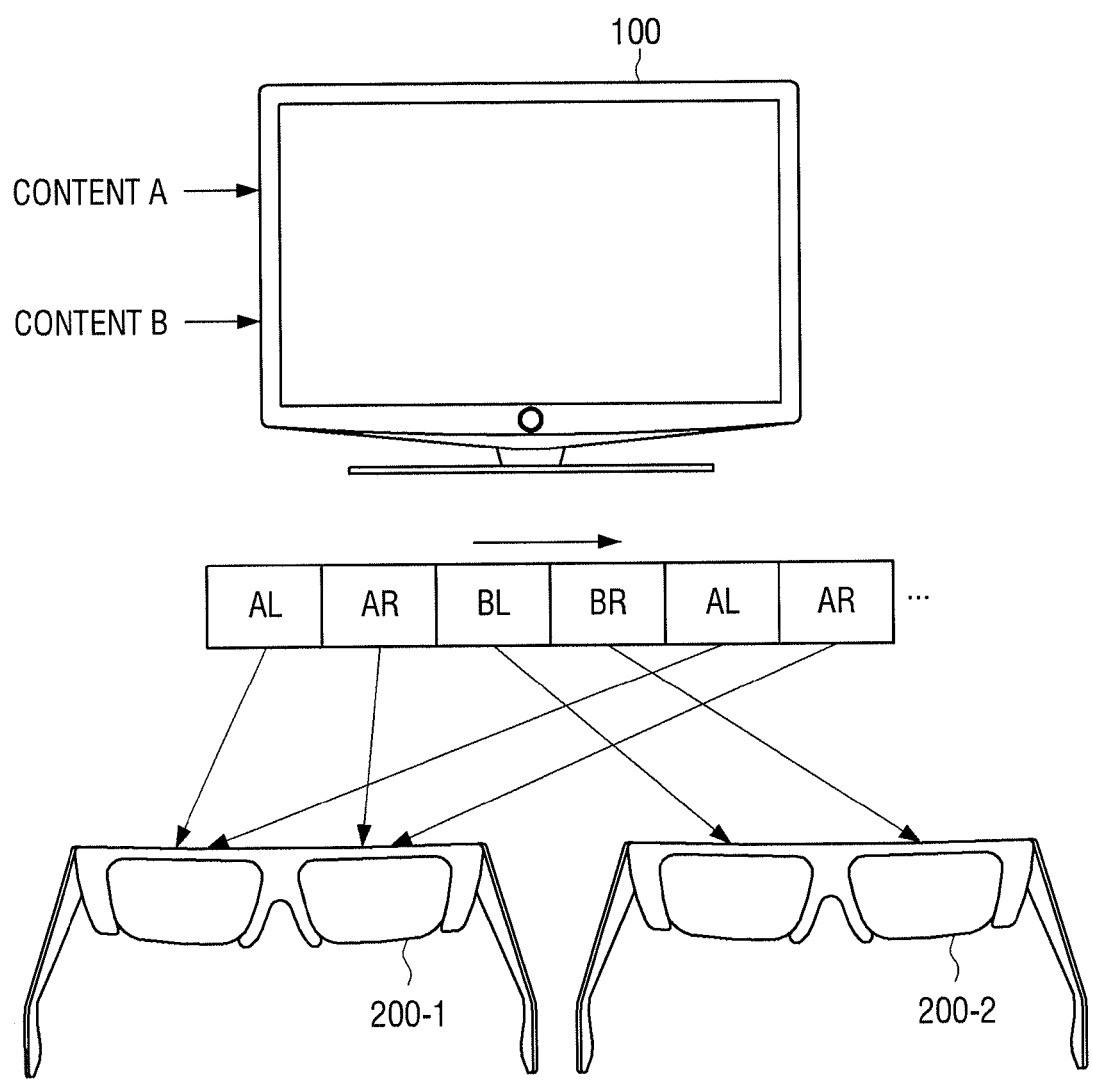
FIG. 2 is a view illustrating a display apparatus which provides a multi-view function using two 3D contents according to an exemplary embodiment.

FIGS. 1 and 2 illustrate a configuration and an operation of a display system according to exemplary embodiments. The display system includes a display apparatus 100 and glasses apparatuses 200-1 and 200-2. Although the display apparatus 100 is realized by a television in FIGS. 1 and 2, the display apparatus 100 may be realized by various kinds of apparatuses having a display, such as a mobile phone, a personal digital assistant (PDA), a laptop or tablet personal computer (PC), a monitor, an electronic book (e-book), an electronic album, a kiosk, etc.

The display apparatus 100 provides a multi-view function. The multi-view function refers to a function that provides a plurality of different contents using a single display apparatus 100. If two contents are displayed as shown in FIGS. 1 and 2, such a multi-view function may be referred to as a dual view function. Throughout the specification, the term "multi-view function" is used. If the multi-view function is selected, the display apparatus 100 generates a plurality of content views and displays the content views in sequence.

In FIG. 1, a plurality of content views are constituted using two two-dimensional (2D) contents A and B and are alternately displayed according to an exemplary embodiment. In FIG. 1, the content views are illustrated as A and B for convenience of explanation. The contents A and B may be various types of contents such as a broadcast program received through a broadcast channel, a multi-media content provided from a network source, and a multimedia content stored in a storage element provided internal or external to the display apparatus 100. Contents A and B may be moving image contents, still images, text, graphical user interfaces, etc.

The glasses apparatuses 200-1 and 200-2 may be realized in a shutter glasses method. In a shutter glasses method, each of the left-eye glass and the right-eye glass of a glasses apparatus contain a shutter (for example, a liquid crystal layer which opens and closes by controlling the polarization of the liquid crystals) which is synchronized with a display apparatus so as to allow a user to view only the images intended. Specifically, the first glasses apparatus 200-1, which is matched with the content A, opens both the left-eye shutter and the right-eye shutter when the content view A is output, and closes both the left-eye shutter and the right-eye shutter when the content view B is output. Accordingly, a user who wears the first glasses apparatus 200-1 recognizes only the content view A.

On the other hand, the second glasses apparatus 200-2, which is matched with the content B, opens both shutters when the content B is output. Accordingly, a user who wears the second glasses apparatus 200-2 recognizes only the content view B.

The display apparatus 100 transmits a synchronization (sync) signal so that each of the glasses apparatuses 200-1 and 200-2 can be synchronized with an output time of each content view. The sync signal is a signal to synchronize a time at which a content view is displayed on the display apparatus 100 with a time at which shutter glasses of a glasses apparatus matched with the corresponding content view are operated. Depending on an exemplary embodiment, the sync signal may be realized to inform a time at which one content view is displayed or include sync information regarding each of the entire content views.

The sync signal may be transmitted in various ways. For example, the sync signal may be transmitted by broadcasting an infrared ray (IR) signal or a radio frequency (RF) signal, or may be transmitted according to various wireless communication protocols such as Bluetooth, Wi-Fi, ZigBee, or IEEE. Hereinafter, a case where the sync signal is transmitted according to the Bluetooth method will be explained.

FIG. 2 is a view illustrating a display apparatus which performs a multi-view function using two three-dimensional (3D) contents A and B according to an exemplary embodiment. The 3D content includes a left-eye image and a right-eye image. Accordingly, the content A includes a left-eye image content view AL and a right-eye image content view AR, and the content B includes a left-eye image content view BL and a right-eye image content view BR. Accordingly, the content views AL, AR, BL, and BR are displayed in sequence.

A first glasses apparatus 200-1 opens a left-eye shutter in synchronization with an output time of the left-eye image content view AL of the content A, and opens a right-eye shutter in synchronization with an output time of the right-eye image content view AR of the content A. Accordingly, a user who wears the first glasses apparatus 200-1 can view the 3D content A three-dimensionally. On the other hand, a second glasses apparatus 200-2 opens a left-eye shutter in synchronization with an output time of the left-eye image content view BL of the content B and opens a right-eye shutter in synchronization with an output time of the right-eye image content view BR of the content B. Accordingly, a user who wears the second glasses apparatus 200-2 can view the 3D content B three-dimensionally.

The display system of FIGS. 1 and 2 may perform a function of reproducing a single 3D content as well as the multi-view function. If a single 3D content is reproduced, each glasses apparatus 200-1 and 2002—alternately opens the left-eye shutter and the right-eye shutter in synchronization with display times of the left-eye image and the right-eye image.

If communication with the glasses apparatus is connected in such a display system, the display apparatus 100 provides a sync signal. Each of the glasses apparatuses 200-1 and 200-2 drives each shutter glass using the sync signal. Each of the glasses apparatus 200-1 and 200-2 is synchronized with an output time of a content view that the user of the glasses apparatus wishes to view from among the content views currently displayed on the display apparatus 100.

Figure 3:
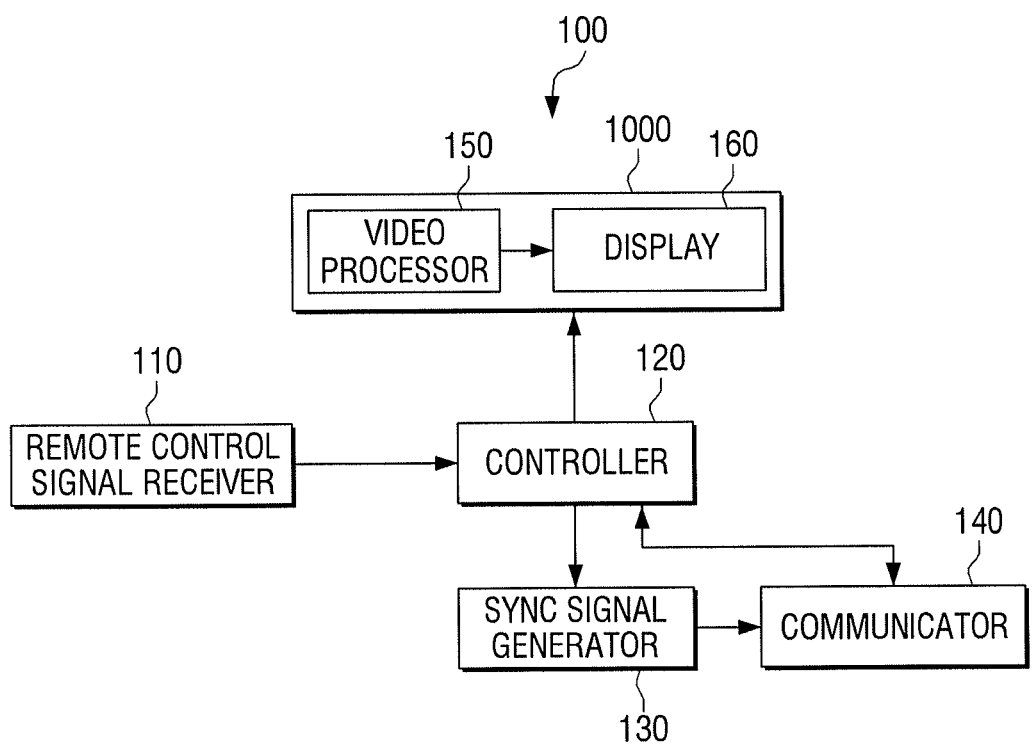
FIG. 3 is a block diagram illustrating a display apparatus according to an exemplary embodiment.

FIG. 3 is a block diagram illustrating a display apparatus according to an exemplary embodiment. Referring to FIG. 3, the display apparatus 100 includes a remote control signal receiver 110, a controller 120, a sync signal generator 130, a communicator 140, a video processor 150, and a display 160.

The remote control signal receiver 100 receives a remote control signal from a remote controller. The remote control signal may be transmitted in various communication methods. For example, the remote control signal may be a code signal which is a combination of a leader code, a custom code, and a data code, and may be transmitted using a carrier frequency signal included in a frequency band defined according to a manufacturer or a product.

The controller 120 performs various operations according to remote control signals received at the remote control signal receiver 110. For example, if a turn-on command is input, the controller 120 supplies power to each components in the display apparatus 100 and turns on the display apparatus 100. Also, if a channel change command or a volume control command is input, the controller 120 may perform channel changing or volume controlling. Although only the remote control signal receiver 110 is illustrated, the controller 120 may perform various control operations according to user commands input through buttons or inputting means provided on the display apparatus 100.

If a command to execute a multi-view function is input, the controller 120 controls the video processor 150 to process a plurality of contents and generate a plurality of content views. The content recited herein may be a multimedia content which is provided from various sources as described above. The content view recited herein refers to a video frame of each content. A content providing source and a type thereof will be explained below.

The video processor 150 detects video data from each content and generates a video frame using the video data. The video processor 150 places the video frames generated based on different contents at least one at a time, alternately, thereby forming output data.

The display 160 receives the output data which is formed by the video processor 150 and displays a plurality of content views alternately.

The video processor 150 and the display 160 constitute an outputter 1000 to output contents. The outputter 1000 may further include elements in addition to the video processor 150 and the display 160.

The sync signal generator 130 generates a sync signals regarding the plurality of content views. The sync signal may be generated in various formats according to a wireless communication method applied between the display apparatus 100 and the glasses apparatus. For example, the sync signal may be generated as an RF signal or an IR signal or may be generated in the format of a data packet according to various kinds of wireless communication standards such as Bluetooth, Wi-Fi, ZigBee, or IEEE.

As described above, the sync signal may be realized in various forms and include various information according to exemplary embodiments.

For example, the sync signal may be generated for each content view and transmitted. In this case, a plurality of frequencies of a carrier signal may be allocated according to the number of content views, and a clock signal where a rising edge and a falling edge are formed according to a time at which each content view is displayed may be modulated to each frequency signal and output.

In another exemplary embodiment, the sync signal may be transmitted in a form that includes all of synchronization information regarding each of the entire content views. In this case, a glasses apparatus may receive and store the information, and use synchronization information corresponding to a specific content view in order to perform synchronization according to a user's selection.

To be specific, the sync signal may include a reference clock signal and sync information to inform a time at which each content view is displayed with reference to the reference clock signal. The sync information may consist of information which indicates a delay time from a specific point within a reference clock signal such as a rising edge or a falling edge to a time at which each content view is displayed.

Alternatively, the sync signal may be divided into a plurality of sync periods. Each of the sync periods is divided by a rising edge or a falling edge of a pulse indicating synchronization information. The sync signal may include state information indicating whether a multi-view function is currently executed or a 3D content is reproduced in every sync period, and time information to synchronize an output time of each content view and a driving time of shutter. The time information may be realized by sync information directly informing an output time of each content view, and may include reference time information and delay information which indicates a delay time from the reference time to the output time of each content view. In addition, the sync signal may include diverse information according to exemplary embodiments. For example, the sync signal may include unique information of the entire glasses apparatuses paired with the display apparatus 100.

The communicator 140 transmits the sync signal generated by the sync signal generator 130 to external glasses apparatuses. The communicator 140 may communicate with the glasses apparatuses according to the above-described various kinds of communication methods.

If a multi-view function is executed and thus a plurality of content views are displayed, the controller 120 may select a target content view which is controllable by a remote controller from among those content views. The target content view refers to a view that is authorized to be controlled by the remote controller. The target view may be changed according to user selection. That is, the user may select a content view synchronized with his/her own glasses apparatus as the target content view by manipulating various keys on the remote controller.

If a remote control signal is received, the controller 120 processes the target content view from among the plurality of content views according to the remote control signal. For example, if the content displayed on the target content view is a broadcast signal, a channel or a volume may be controlled by selecting a channel key or a volume key, and, if the content is a multimedia content file, operations such as content change, rewind, fast forward, replay, pause, and stop may be controlled.

If a new glasses apparatus is connected to the communicator 140, the controller 120 controls the communicator 140 to transmit information on the target content view to the new glasses apparatus. Accordingly, the new glasses apparatus is controlled to synchronize with the target content view. Herein, the new glasses apparatus refers to a glasses apparatus which performs pairing while communication with a display apparatus is cut off, or a glasses apparatus which performs a re-connection.

Figure 4:
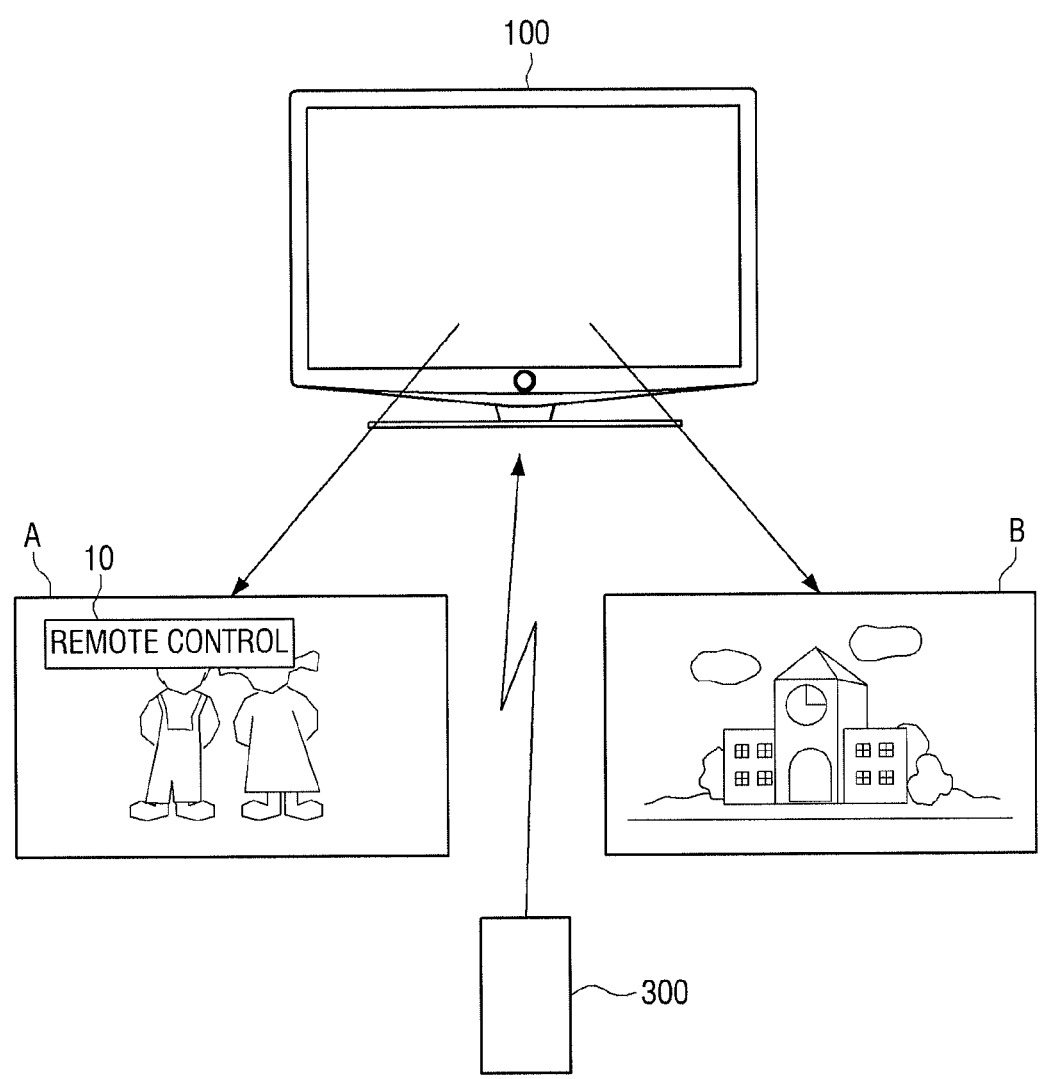
FIGS. 4 and 5 are views illustrating an operation of selecting a target content view using a remote controller on a display apparatus according to exemplary embodiments.
Figure 5:
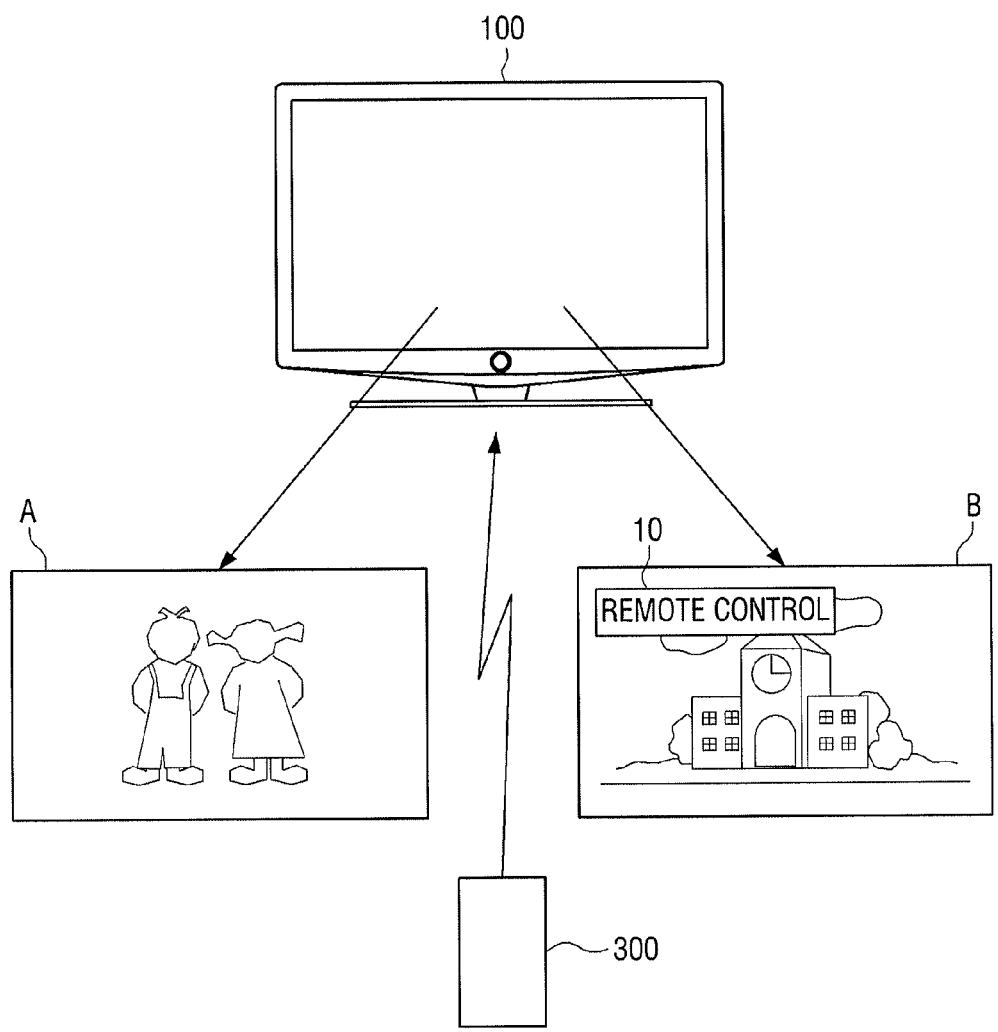

FIGS. 4 and 5 are views illustrating an operation of selecting a content view which is assigned remote control authority, that is, a target content view according to exemplary embodiments.

Referring to FIGS. 4 and 5, the display apparatus 100 sequentially displays content views A and B. In order to change one of the plurality of content views (for example, if content view A is a broadcast channel and the user wishes to change content view A to a different broadcast channel), the content view that the user wishes to change (in this example, convent view A) is first assigned remote control authority. In other words, one of the plurality of content views is selected as the target content view. The user may select a target content view using a specific key which is assigned a function for changing remote control authority from among keys provided on a remote controller 300. For example, a left direction key may be matched with a function to select a first content view and a right direction key is matched with a function to select a second content view. If, in this example, a left direction key signal is input, the controller 120 may select the first content view A as the target content view, and, if a right direction key signal is input, the controller 120 may select the second content view B as the target content view.

Alternatively, number keys such as a number one key or a number two key may be matched with a function to change the remote control authority. Also, a single key may be matched with such a function. In this example, if a corresponding key is pressed, the remote controller 200 transmits a remote control signal including a command to change the control authority to the display apparatus 100. If the control authority change command is received in a state where the content view A is the target content view, the controller 120 selects the content B as the target content view. That is, the controller 120 selects the next content view as the target content view every time the remote control signal including the control authority change command is received.

In FIG. 4, the content view A is selected as the target content view. An on screen display (OSD) message 10 indicating that the target content view A is controllable by the remote controller is displayed on the content view A.

If the remote controller 300 is manipulated in this state, the content view B is selected as the target content view as shown in FIG. 5. Accordingly, the OSD message 10 is displayed on the target content view B.

The controller 120 may set the target content view using a control authority setting region which is provided in an internal memory (not shown) for the purpose of setting the target content view. For example, in a state where a dual view mode is executed and thus two content views are displayed, if a first content view is selected as a target content view, the controller 120 may record a digital code 00 on the control authority setting region. On the other hand, if a second content view is selected as the target content view, the controller 120 may record a digital code 01. If the control authority change command is input, the controller 120 changes the digital code from 00 to 01 or from 01 to 00. After that, if various control signals are input, the controller 120 identifies the code recorded on the control authority setting region and determines a content view to be processed. The controller 120 controls an element for processing the determined content view, and processes the content view according to the input control signals. The detailed operation will be explained in detail below.

Although only the OSD message 10 is displayed on the target content view to inform that the content view is controllable by the remote controller in FIGS. 4 and 5, any other OSD messages may be displayed on the content view.

For example, if communication with a new glasses apparatus is connected, the controller 120 may display an OSD message indicating that the new glasses apparatus is connected on the content view. In this case, the OSD message may be displayed only on the content view selected as the target content view from among the plurality of content views. The communication connection may refer to reconnection after communication is broken down after initial pairing is achieved, as well as initial pairing of the glasses apparatus.

As described above, if communication between the new glasses apparatus and the display apparatus 100 is connected, the controller 120 transmits information on the target content view to the new glasses apparatus so that the new glasses apparatus is synchronized with the content view selected as the target content view at that time. Accordingly, the new glasses apparatus is automatically synchronized with the output time of the target content view after the communication is connected.

Figure 6:
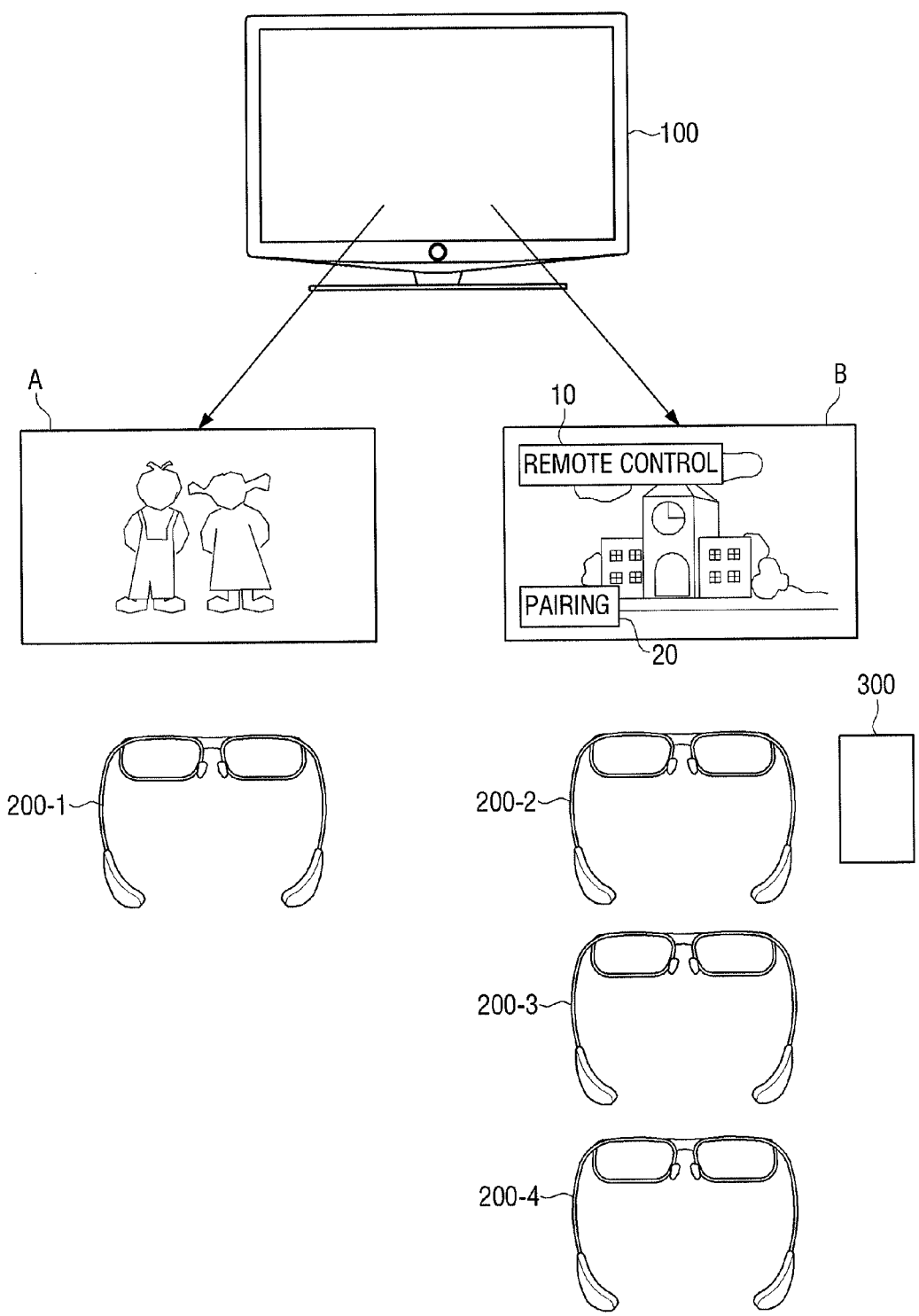
FIG. 6 is a view illustrating an operation when a new glasses apparatus is added according to an exemplary embodiment.

FIG. 6 is a view illustrating communication connected between a new glasses apparatus and a display apparatus according to an exemplary embodiment. Referring to FIG. 6, the display apparatus 100 displays the two content views A and B alternately. The display apparatus 100 transmits a sync signal so that each content view is synchronized with a glasses apparatus.

In FIG. 6, first and second glasses apparatuses 200-1 and 200-2 are already connected to the display apparatus 100 for communication. The first glasses apparatus 200-1 is synchronized with an output time of the first content view A and turns on left and right shutters, and the second glasses apparatus 200-2 is synchronized with an output time of the second content view B and turns on left and right shutters. As described above, the users of the first and the second glasses apparatuses 200-1 and 200-2 may have control authority of the remote controller 300 selectively. In FIG. 6, the second content view B is selected as the target content view.

In this state, if third and fourth glasses apparatuses 200-3 and 200-4 are newly paired, the display apparatus 100 transmits information indicating that the second content view B is controllable by the remote controller, that is, information on the target content view, to the third and the fourth glasses apparatuses 200-3 and 200-4. If the communication is completed, the third and the fourth glasses apparatus 200-3 and 200-4 are synchronized with the second content view B directly based on the sync signal. If the third and the fourth glasses apparatus 200-3 and 200-4 are connected for communication, the display apparatus 100 displays a message 20 indicating the connection state on the second content view B, which is the target content view. Accordingly, the users who wear the third and the fourth glasses apparatuses 200-3 and 200-4 can recognize that their own glasses apparatuses are normally paired and may control processing of their content view B using the remote controller 300.

In the above exemplary embodiments, the display apparatus 100 transmits the information on the target content view to the glasses apparatus and the glasses apparatus is automatically synchronized with the target content view. However, according to another exemplary embodiment, the controller 120 may directly match the new glasses apparatus with the target content view. In this embodiment, the controller 120 may transmit a sync signal corresponding to the output time of the target content view to the new glasses apparatus, instead of transmitting the information on the target content view to the new glasses apparatus. That is, if each glasses apparatus is paired and is matched with one of the plurality of content views, the controller 120 stores an ID of the glasses apparatus along with the information on the matched content view. The controller 120 generates a sync signal according to information on the output time of the corresponding content view and transmits the sync signal using the ID of the corresponding glasses apparatus. In this exemplary embodiment, the sync signal may be generated differently according each content view and may be transmitted. The other elements are similar to those of FIG. 3 in their operations and thus detailed illustrating and explanation are omitted.

Figure 7:
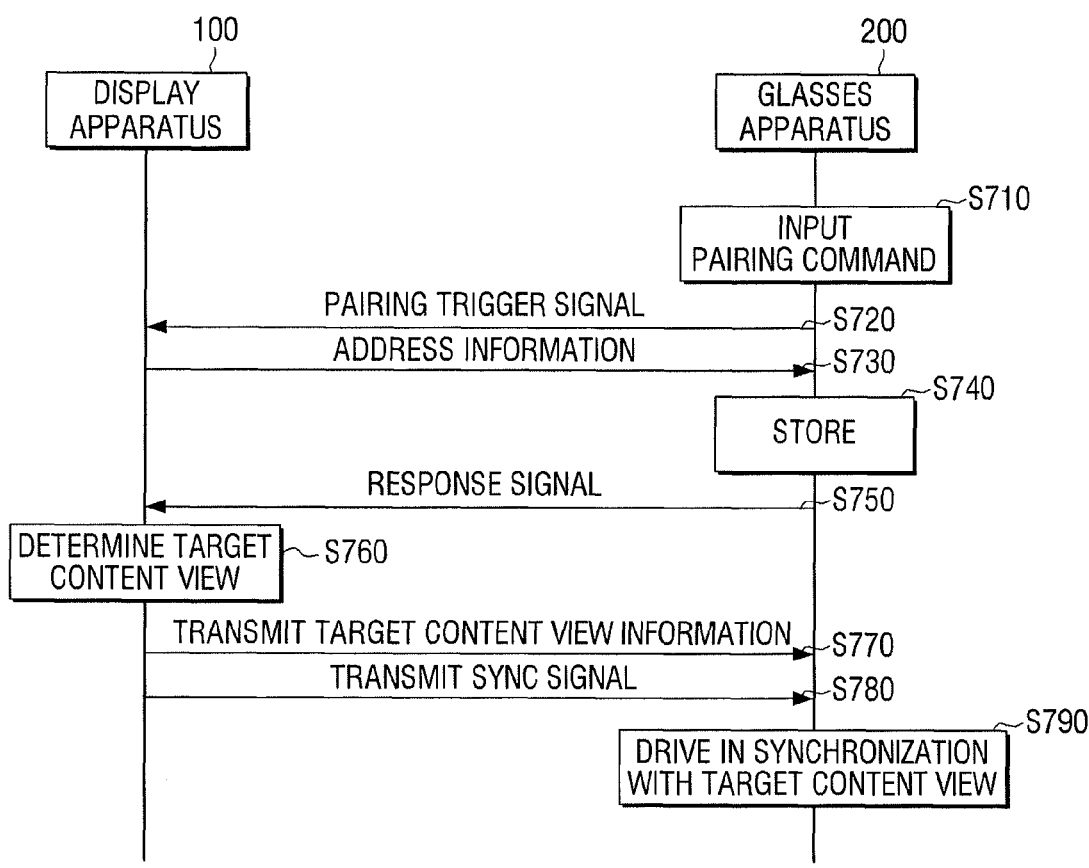
FIG. 7 is a view illustrating a pairing process between a display apparatus and a glasses apparatus according to an exemplary embodiment.

FIG. 7 is a timing chart to explain an operation between a display apparatus 100 and a glasses apparatus 200 according to an exemplary embodiment. FIG. 7 illustrates an operation if the glasses apparatus 200 is connected when the display apparatus 100 is performing a multi view function.

Referring to FIG. 7, a user who wears the glasses apparatus 200 may input a pairing command by manipulating a key provided on the glasses apparatus 200 (S710). If the pairing command is input, the glasses apparatus 200 transmits a pairing trigger signal to the display apparatus 100 (S720). The pairing trigger signal may include diverse information including address information of the glasses apparatus 200. The pairing trigger signal may be referred to as an inquiry signal. The pairing trigger signal may be broadcasted to external apparatuses including the display apparatus 100.

If the pairing trigger signal is received, the display apparatus 100 transmits a response signal including address information to the glasses apparatus 200 (S730). The glasses apparatus 200 stores the address information included in the response signal (S740). The glasses apparatus 200 transmits a response signal using the stored address information (S750). The response signal may include information for pairing with the display apparatus. A format of this signal may vary depending on the communication method. The signal format will be explained in detail below.

If the response signal is received, the display apparatus 100 establishes a communication link with the glasses apparatus 200 using the information included in the response signal.

If the communication link with the glasses apparatus 200 is established, the display apparatus 100 determines which content view is controllable by a remote controller from among a plurality of content views, that is, which one is a target content view (S760). If the target content view is determined, the display apparatus 100 transmits information on the target content view to the glasses apparatus 200 (S770). Also, the display apparatus 100 transmits a sync signal to the glasses apparatus 200 (S780). The information on the target content view or the sync signal may include information on a current operational state of the display apparatus 100. For example, information regarding whether a currently displayed content is a 3D content or a 2D content or whether the display apparatus displays a single content or is operated in a multi-view mode to process a plurality of contents may be transmitted to the glasses apparatus 200. The glasses apparatus 200 is directly synchronized with the target content view using the sync signal and the information on the target content view, and is driven (S790). That is, if the display apparatus is operated in the multi-view mode, the glasses apparatus 200 collectively opens and closes the left-eye shutter and the right-eye shutter according to an output time of the target content view.

Although the information on the target content view is transmitted to the glasses apparatus in a Bluetooth communication method, only the pairing process may be performed in the Bluetooth communication method and the information on the target content view may be provided to the glasses apparatus in an RF communication method.

That is, the display apparatus 100 transmits the sync signal in the Bluetooth communication method, and transmits an audio signal in the RF communication method. In this case, each of the display apparatus 100 and the glasses apparatus 200 should include both a Bluetooth module and an RF communication module. Also, the RF communication module should be paired separately from the Bluetooth module. If the Bluetooth pairing is achieved, the display apparatus 100 transmits a pairing packet using the RF communication module (not shown). The glasses apparatus perform audio pairing by transmitting a response signal in response to the pairing packet. If the audio pairing with the glasses apparatus 200 is achieved, the display apparatus 100 may transmit the information on the target content view using the RF communication module.

Figure 8:
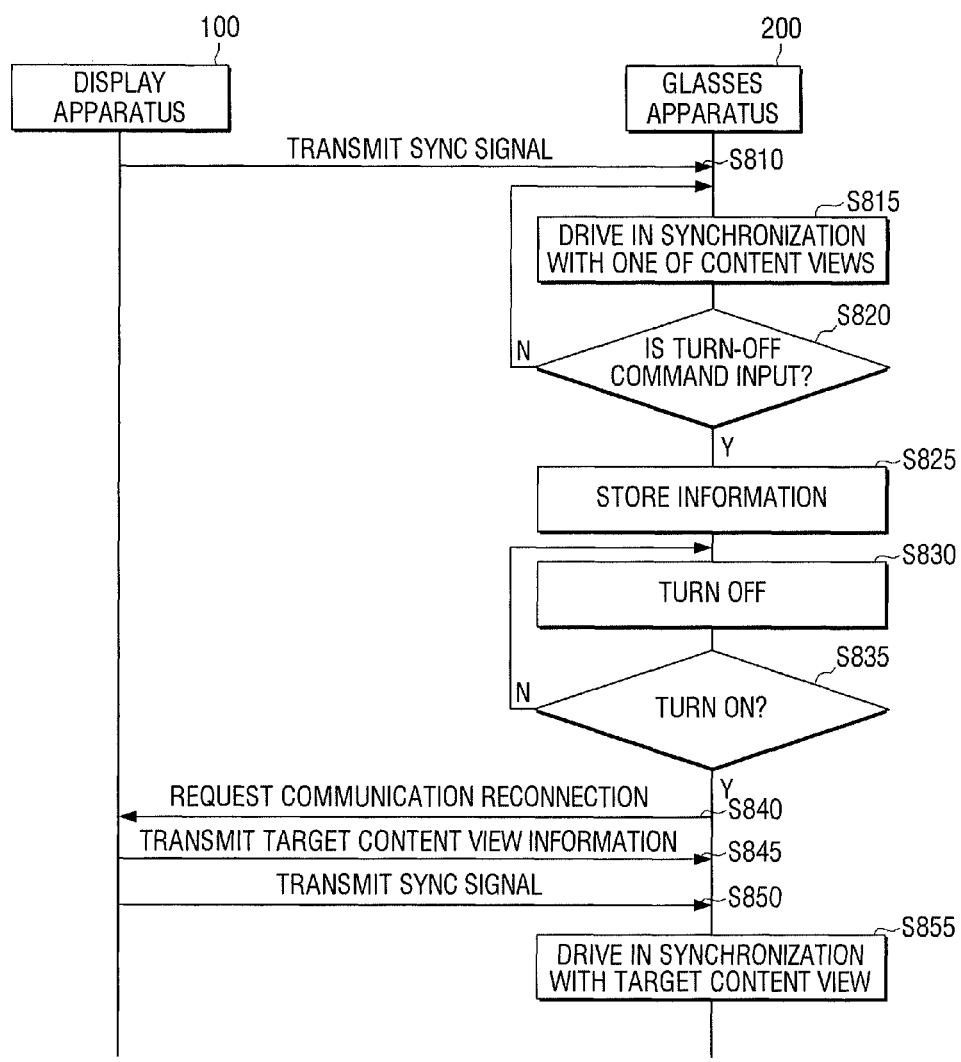
FIG. 8 is a view illustrating a communication reconnecting process between a display apparatus and a glasses apparatus according to an exemplary embodiment.

In FIG. 7, the glasses apparatus is newly paired. However, the glasses apparatus may be reconnected after the communication is broken down. FIG. 8 is a timing chart illustrating an operation of reconnecting communication according to an exemplary embodiment.

Referring to FIG. 8, the display apparatus 100 transmits a sync signal to the glasses apparatus 200 which is connected to the display apparatus 100 for communication (S810). The glasses apparatus 200 is synchronized with one of the plurality of content views and is driven (S815). The user may select a content view using a button provided on the glasses apparatus 200. If the button is selected, the glasses apparatus 200 is synchronized with a next content view of the currently synchronized content view. As described in more detail below, if the sync signal transmitted from the display apparatus 100 includes sync information of each content view, the glasses apparatus 200 may include means to select one of the plurality of content views (for example, a switch).

If a turn-off command is input in this state (S820), the glasses apparatus 200 stores information on the currently synchronized content view (S825). In addition, the glasses apparatus 200 may store diverse information received from the display apparatus 100. If the information is stored, the glasses apparatus 200 performs a turn-off operation (S830).

The turn-off command may be input by manipulating a button provided on the glasses apparatus 200 or may be transmitted from the display apparatus 100 when the display apparatus 100 is turned off. Even if a separate turn-off command is not input from the user, the glasses apparatus 200 may automatically store the information and then is turned off if a motion sensor provided in the glasses apparatus 200 does not sense any motion for more than a predetermined time or if a touch sensor, which is provided on the glasses apparatus out of reach of the user's body, does not sense contact for more than a predetermined time.

If turn-on is performed in the turn-off state (S835), the glasses apparatus 200 transmits a signal for requesting communication reconnection with the display apparatus 100 using the pre-stored address information of the display apparatus 100 (S840). The display apparatus 100 transmits information on the target content view in response to this request signal (S845), and transmits a sync signal (S850). The glasses apparatus 200 is synchronized with the target content view based on the information on the target content view and the sync signal, and is driven (S855).

Figure 9:
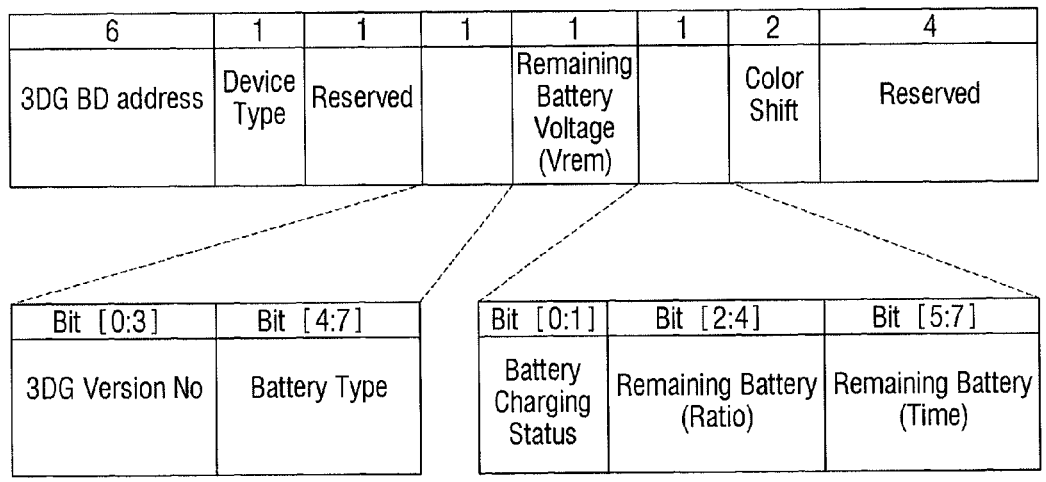
FIG. 9 is a view illustrating an example of a packet configuration exchanged between a display apparatus and a glasses apparatus according to an exemplary embodiment.

As described above, the glasses apparatus 200 can be directly synchronized with the content view controllably by the remote controller if communication is reconnected, as well as if communication with the display apparatus 100 is initially connected. The glasses apparatus 200 and the display apparatus 100 may be connected to each other for communication according to various communication methods. One of them is the Bluetooth standard. FIG. 9 illustrates an example of a packet format transmitted during a pairing process according to the Bluetooth standard according to an exemplary embodiment.

Referring to FIG. 9, the packet may include information on a Bluetooth address (3DG BD address), a device type, a version of the glasses apparatus (3DG version No), a battery type, a remaining battery voltage, a battery charting status, a remaining battery ratio, a remaining battery time, and a color shift.

FIG. 9 illustrates a packet comprised of 17 bytes. If a transport packet is comprised of 17 bytes, there is a reserved region of 1 byte and 4 bytes. Additional information may be recorded on this reserved region.

In the above exemplary embodiments, the plurality of content views are displayed using video data of the plurality of contents. However, the content may be a moving picture or other content.

Figure 10:
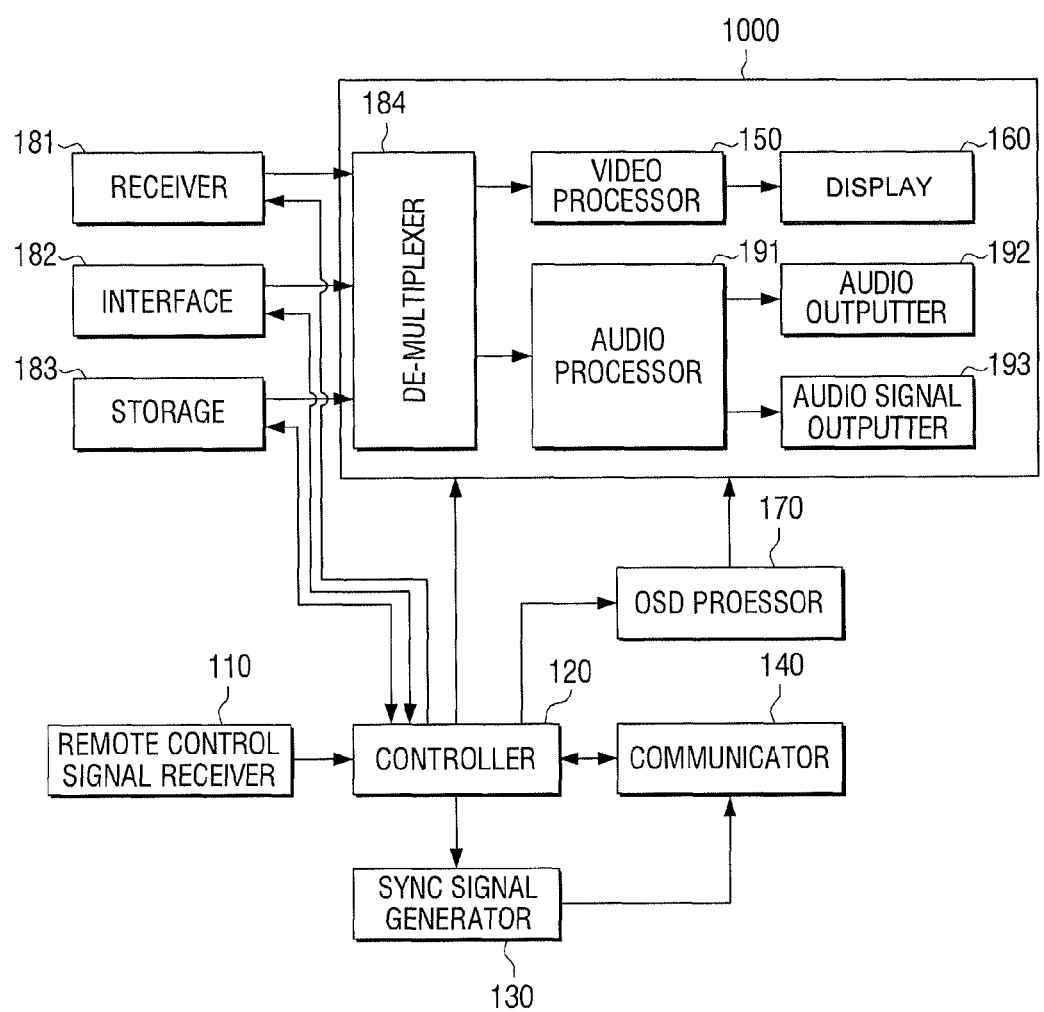
FIG. 10 is a block diagram illustrating a display apparatus according to another exemplary embodiment.

FIG. 10 is a block diagram illustrating a display apparatus which processes a moving image content according to an exemplary embodiment. Referring to FIG. 10, the display apparatus 100 includes a remote control signal receiver 110, a controller 120, a sync signal generator 130, a communicator 140, an OSD processor 170, an outputter 1000, a receiver 181, an interface 182, and a storage 183.

The outputter 1000 processes a content and outputs the content. The outputter 1000 includes a de-multiplexer 184, a video processor 150, a display 160, an audio processor 191, an audio outputter 192, and an audio signal outputter 193. The outputter 1000 receives a content through the receiver 181, the interface 182, and the storage 183, and processes the content.

The receiver 181 receives a broadcast program content through a broadcast network. The receiver 181 may include a tuner to tune to a broadcast channel, a demodulator to demodulate a broadcast signal received through the tuned broadcast channel, and an equalizer to equalize the demodulated broadcast signal. The receiver 181 may be realized in various forms according to a broadcast standard adopted by a country where the display apparatus 100 is used. Also, although one receiver 181 is illustrated in FIG. 10, the receiver 181 may be a plurality of receivers. That is, if a multi-view function is performed using a plurality of broadcast programs, the controller 120 controls the plurality of receivers 181 to tune to different broadcast channels. The outputter 1000 forms a plurality of content views using the broadcast signals received through the broadcast channels, and alternately outputs the content views on a screen.

The interface 182 receives a content file from a server apparatus through the Internet or other local networks. In particular, in order to accesses a web server through the Internet and receive a content file, the interface 182 may be realized by a network interface card.

The storage 183 stores various content files. The storage 183 may store a recording file in which the broadcast signal received at the receiver 181 is recorded or may store a content file streamed or downloaded through the interface 182. In addition, the storage 183 may store an operating system (O/S) or other programs to drive the display apparatus 100 and various setting values set by the user for the display apparatus 100. In particular, the storage 183 may store final information on a content selected in a single view mode and final information on a content selected in a multi-view mode. If the display apparatus 100 is turned on after having been turned off or is switched between the single view mode and the multi-view mode, the controller 120 selects a content using the final information stored in the storage 183. This will be explained in detail below.

The controller 120 controls an overall operation of the display apparatus 100 according to user's selection. The display apparatus 100 may support the multi-view mode and the single view mode. If the multi-view mode is selected, the controller 120 may obtain a plurality of contents using the receiver 181, the interface 182, and the storage 183. Although not shown in FIG. 10, the display apparatus 100 may further include a reproducing apparatus have a variety of external recording media mounted thereon to reproduce data. For example, if a recording medium such as a CD, a DVD, a blue-ray disk, a memory card, or a USB memory is mounted, the display apparatus 100 may further include a reproducing means for reading out data from the recording medium.

The de-multiplexer 184 separates audio data and video data from the content obtained through various elements such as the receiver 181, the interface 182, and the storage 183. The separated video data is provided to the video processor 150 and the separated audio data is provided to the audio processor 191.

The video processor 150 decodes the video data, scales the video data according to a screen size, and then converts a frame rate according to an output rate. If the multi-view mode is initiated, the video processor 150 generates video frames using video data of different contents, and connects the video frames to a top-to-bottom format or a side-by-side format, thereby generating output video data.

The display 160 alternately displays the plurality of content views on the screen using the output video data generated by the video processor 150. The display 160 may be realized by a liquid crystal display (LCD) including a display panel (not shown) and a backlight (not shown). However, the display 160 may be realized by other displays such as an organic light emitting diode (OLED) type display or a plasma display panel (PDP) type display.

The audio processor 191 performs various processing such as decoding, noise filtering, and amplification with respect to the audio data provided by the de-multiplexer 184. The audio processor 191 provides the processed audio data to the audio outputter 192 or the audio signal outputter 193. The audio outputter 192 outputs an audio signal (for example. a speaker), and the audio signal outputter 193 modulates the audio signal and transmits it to an external apparatus.

The audio signal outputter 193 includes an RF communication module. The audio signal outputter 193 performs pairing with the RF communication module included in the glasses apparatus 200, and thus transmits diverse information such as target content view information and volume information as well as the audio signal.

The controller 120 may be operated in the single view mode or the multi-view mode as described above. The single view mode or the multi-view mode may be selected on a menu screen. For example, if a menu command is input through the remote control signal receiver 110 or a key provided on a body of the display apparatus 100, the controller 120 displays a menu screen including various menus executable by the display apparatus 100. If a multi-view menu is selected on the menu screen, the controller 120 performs the multi-view mode and thus generates the plurality of content views as described above.

If the multi-view mode is selected, the controller 120 may directly select a plurality of sources using a default value and may generate a plurality of content views. However, alternatively, the user may select a number of content views, a source, and a content. That is, if the multi-view menu is selected, the controller 120 may display a content selection screen through the display 160 to select the number of content views, a source of a content view, and a content name.

If the user selects the number of content views as two and selects a source of each content view as a television (TV) broadcast signal, the controller 120 controls the receiver 181 and the outputter 1000 to receive two broadcast signals and generate two content views.

In this case, the controller 120 may determine a content to be displayed on each content view using final information stored in the storage 183. The final information may be source information, channel information, and/or volume information.

For example, if a broadcast signal may be selected as a source of first and second content views broadcast channels 10 and 11 may have been selected as the first and second content views in a multi-view mode. In this example, if the multi-view mode is terminated or if the display apparatus 100 is turned off, the controller 120 stores broadcast channel information of each content view in the storage 183. Volume information may be stored along with the broadcast channel information. If the multi-view mode is initiated again, the controller 120 directly tunes to channel 10 and channel 11 using the stored channel information, and then controls to generate the first and the second content views using the broadcast signal received through those channels. The volume information is also identified so that a volume level of the audio signal provided along with the first and the second content views is adjusted to be a final value.

In another example, a stored content (for example, content stored in an internal or external memory device) may be selected as the content of the first content view, and that broadcast channel 20 is selected as the content of the second content view. In this example, if the multi-view mode is terminated or if the display apparatus is turned off, the controller 120 stops producing the corresponding content and stores a storage address, a content name, and a stop time of the content in the storage 183. After that, if the multi-view mode is executed again, the controller 120 resumes the playback of the content from where the user left off, thereby constituting the first content view, and tunes to broadcast channel 20, thereby constituting the second content view.

If a web server or storage media are selected as the source of each content view, the controller 120 controls the outputter 1000 to receive the content through the interface 182 or the storage 183.

The above-described menu screens or the content selection screen may be generated by the OSD processor 170. That is, the OSD processor 170 generates various OSD messages under control of the controller 120 and provides the OSD messages to the display 160. The display 160 renders the OSD message by overlaying it with the video frame on the screen. Also, the OSD processor 170 may generate OSD messages of various forms such as a remote control authority, a pairing state, a channel number, a volume level, or broadcast information.

On the one hand, if the display apparatus 100 is operated in the single view mode, the controller 120 controls the audio processor 191 and the audio outputter 192 to synchronize the audio signal with the video frame of the content currently displayed and output the audio signal. Accordingly, since the audio signal synchronized with the video frame displayed is output through a speaker, the user can view a 2D content without wearing a glasses apparatus.

On the other hand, if the multi-view mode is initiated, the controller 120 controls the audio processor 191 to process the audio data de-multiplexed from the plurality of contents and generate a plurality of audio signals. The controller 120 may control the audio signal outputter 193 to output the plurality of audio signals through different channels. The different channels may be different radio frequency signal channels. That is, the audio signal outputter 193 modulates the audio signals into a carrier wave having different radio frequencies, and transmits the audio signals. Accordingly, each glasses apparatus tunes to a frequency channel using frequency information corresponding to a content view synchronized therewith, demodulate the audio signal received through the frequency channel, and outputs sound. Also, the audio signal outputter 193 configures an audio stream according to a communication format transmittable through the communicator 140 based on the audio signals, and may transmit the audio stream through the communicator 140. Each of the glasses apparatuses detects the audio signal corresponding to the currently synchronized content view from the audio stream, and outputs the audio signal through a speaker or an earphone attached to the glasses apparatus.

If the volume information is not stored, the controller 120 may equally set volume level of the plurality of audio signals as a default value. For example, a volume level of the audio signal can be adjusted through each glasses apparatus. If each glasses apparatus is paired with the display apparatus 100, the audio signal is amplified (up or down) according to the volume level which is set as the default value by the controller 120, and is output. On the other hand, if each glasses apparatus is reconnected after communication is broken down, the audio signal is amplified according to a volume level set before the communication is broken down, and is output. The glasses apparatus will be explained in detail below.

In the exemplary embodiment of FIG. 10, the controller 120 may change the target content view by assigning the remote control authority to content views in sequence according to user's selection. Also, if the communication with the glasses apparatus is connected, the display apparatus transmits information on the target content view to the corresponding glasses apparatus so that the glasses apparatus can be directly synchronized with the target content view.

Because the sync signal generator 130 and the communicator 140 have been described above with reference to FIG. 3, a detailed explanation is omitted.

As shown in FIG. 10, the display apparatus 100 may perform the multi-view function using the contents provided from various sources such as a broadcasting station, a server, or other storage media. However, this is merely an example and some of the features may be modified or omitted. For example, if the display apparatus 100 is realized by a TV without Internet access, the display apparatus 100 may include only a plurality of receivers and may use only a broadcast signal received through the plurality of receivers for the multi-view function.

In the above-described exemplary embodiments, the controller 120 may be realized in various configurations.

Figure 11:
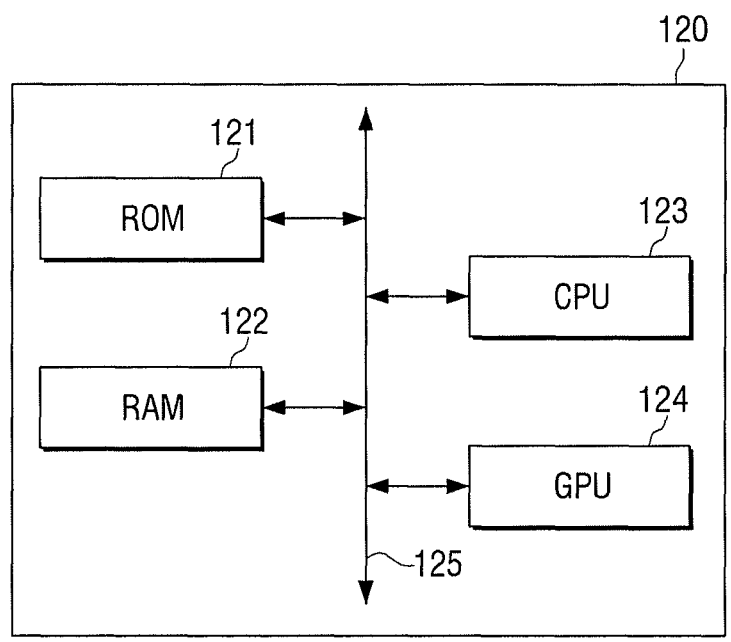
FIG. 11 is a block diagram illustrating an example of a controller according to an exemplary embodiment.

FIG. 11 is a block diagram illustrating an example of the controller according to an exemplary embodiment.

Referring to FIG. 11, the controller 120 includes a read only memory (ROM) 121, a random access memory (RAM) 122, a central processing unit (CPU) 123, a graphic processing unit (GPU) 124, and a bus 125. The ROM 121, the RAM 122, the CPU 123, and the GPU 124 are connected to one another through the bus 125. Although not shown, other registers or interfaces may be provided in the controller 120.

The CPU 123 accesses the storage 183 and performs booting using an O/S stored in the storage 183. The CPU 123 performs various operations using various programs, contents, and data stored in the storage 183.

The ROM 121 stores a command set for system booting. If a turn-on command is input and power is supplied, the CPU 123 copies an O/S stored in the storage 183 to the RAM 122 according to a command stored in the ROM 121, executes the OS, and boots the system. If the booting is completed, the CPU 123 copies various application programs stored in the storage 183 to the RAM 122, executes the application programs copied to the RAM 122, and performs various operations. If a remote control signal to select a multi-view function is input, the CPU 123 loads a program for executing the multi-view function into the RAM 122 and executes the program. If a remote control signal is received, the CPU 123 selects a target content view which is set to have remote control authority using a corresponding program, and outputs a control command to process the target content view in response to a remote control signal to the outputter 1000.

If communication with a new glasses apparatus is connected, the CPU 123 transmits information on the target content view to the new glasses apparatus. In addition, the GPU 124 generates various graphic objects and displays them on a screen. The configuration of the controller 120 illustrated in FIG. 11 is merely an example and the controller 120 may be realized in other configurations.

Figure 12:
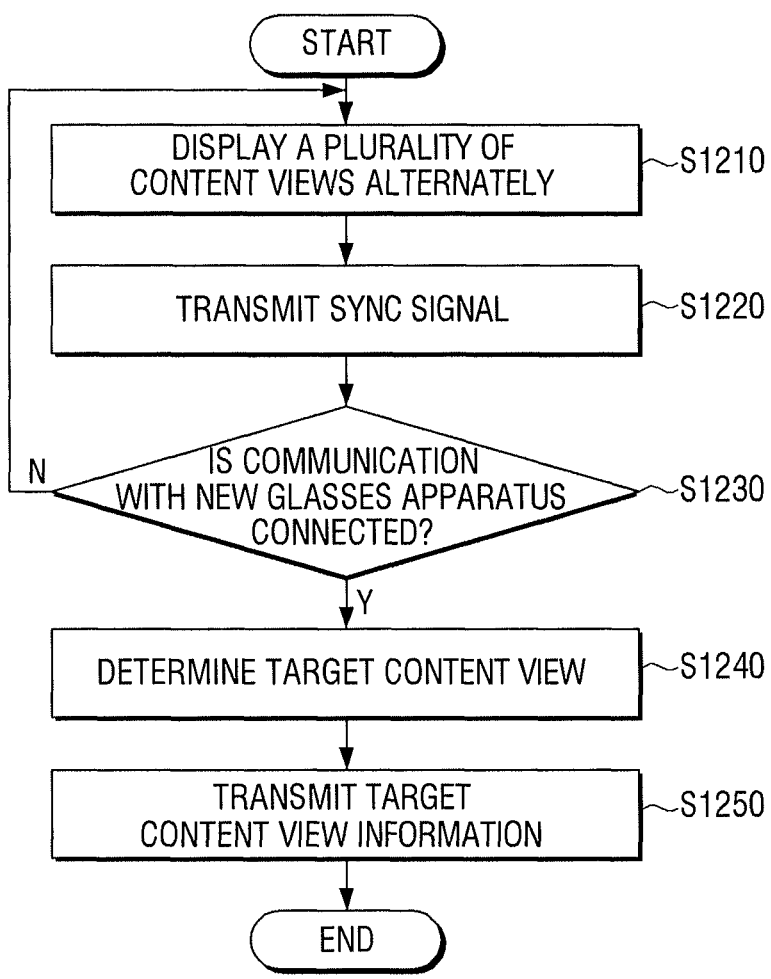
FIG. 12 is a flowchart illustrating a multi-view display method of a display apparatus according to an exemplary embodiment.

FIG. 12 is a flowchart illustrating a multi-view display method of a display apparatus according to an exemplary embodiment. Referring to FIG. 12, the multi-view display method processes a plurality of contents, thereby generating a plurality of video frames, and alternately displays the video frames, thereby providing a plurality of content views (S 1210). The plurality of contents may be selected based on final information of a previous multi-view mode.

The display apparatus 100 transmits a sync signal on each content view (S1220). In this state, if communication with a new glasses apparatus is connected (S 1230), the display apparatus identifies a target content view which is currently controllable by a remote controller (S 1240). If the target content view is identified, the display apparatus transmits information on the target content view to the glasses apparatus (S1250). Such information may be transmitted separately from the sync signal. However, according to an exemplary embodiment, the information may be inserted into a part of the sync signal and may be transmitted along with the sync signal. A format or size of the information on the target content view may be set to an optimal value considering various factors such as a number of supportable content views or an entire size of the sync signal. For example, the glasses apparatus may be notified which content view is the target content view using a two-digit number digital code.

After the communication is connected, the new glasses apparatus is directly synchronized with the target content view according to the information on the target content view. Accordingly, a user who wears the new glasses apparatus can control a processing operation of his/her own content view using the remote controller.

Figure 13:
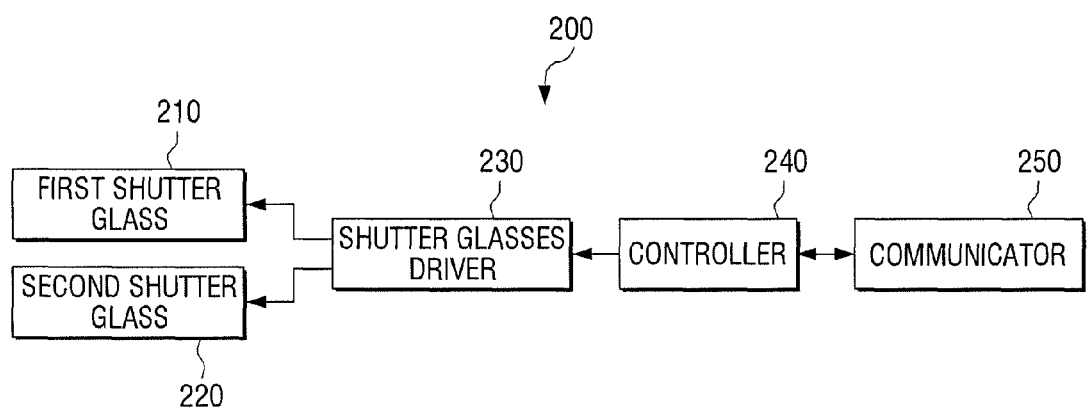
FIG. 13 is a block diagram illustrating a glasses apparatus according to an exemplary embodiment.

FIG. 13 is a block diagram illustrating a glasses apparatus according to an exemplary embodiment. Referring to FIG. 13, a glasses apparatus 200 includes first and second shutter glasses 210 and 220, a shutter glasses driver 230, a controller 240, and a communicator 250.

Each of the first and the second shutter glasses 210 and 220 includes a plurality of transparent electrodes, a liquid crystal layer disposed between the transparent electrodes, a polarization plate, and a transparent substrate to support the aforementioned elements. Accordingly, liquid crystals of the liquid crystal layer are opened or closed according to a voltage applied to the plurality of transparent electrodes. Penetration of light is blocked in a closed state, and light penetrates in an open state like glass.

The shutter glasses driver 230 includes a driving circuit which is connected to the transparent electrodes provided in the first and the second shutter glasses 210 and 220. The shutter glasses driver 230 drives the first and the second shutter glasses 210 and 220 separately by applying a driving signal to the transparent electrodes provided in the first and the second shutter glasses 210 and 220. The shutter glasses driver 230 alternately opens and closes the first and the second shutter glasses 210 and 220 when a 3D content is reproduced. If a multi-view function is executed, the shutter glasses driver 230 turns on or turns off the first and the second shutter glasses 210 and 220 collectively.

If communication connection with a display apparatus 100 is initiated, the communicator 250 receives various signals from the display apparatus 100. Specifically, the communicator 250 may receive information on a target content view which is controllable by a remote controller from among a plurality of content views, and a sync signal.

The controller 240 controls an overall operation of the glasses apparatus 200. Specifically, if the information on the target content view is received from the display apparatus 100, the controller 240 controls the shutter glasses driver 230 to drive the first and the second shutter glasses 210 and 220 in synchronization with the target content view.

If communication is connected between the glasses apparatus 200 and the display apparatus 100, the information on the target content view may be transmitted from the display apparatus 100. Accordingly, if communication is connected, the glasses apparatus 200 can be directly synchronized with the content view which is controllable by the remote controller and displays various messages.

If a multi-view function is executed to display a plurality of contents as described above, each glasses apparatus may separately provide audio data of a synchronized content.

Figure 14:
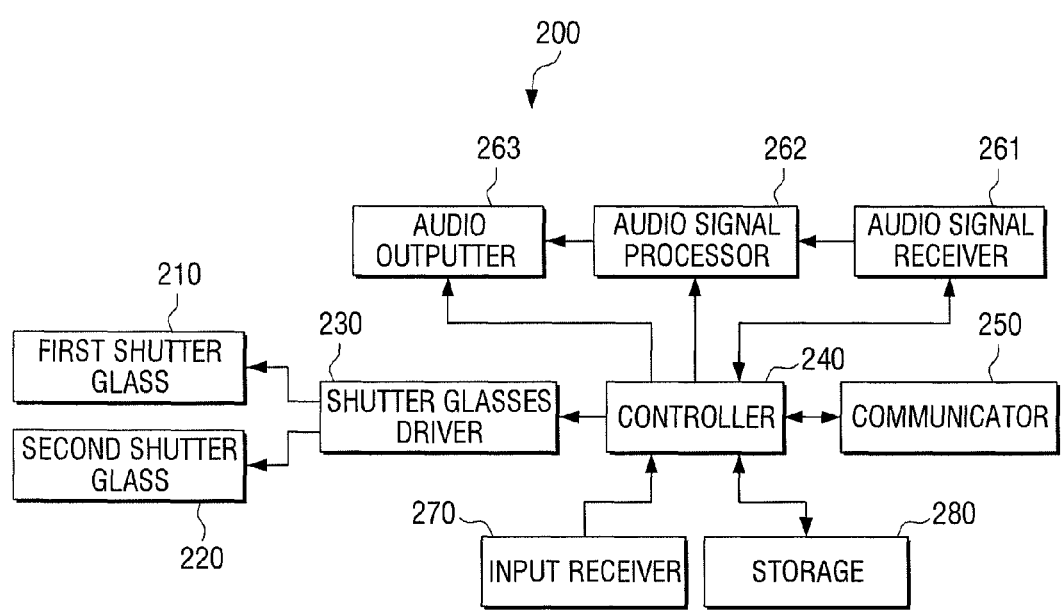
FIG. 14 is a block diagram illustrating a glasses apparatus according to another exemplary embodiment.

FIG. 14 is a block diagram illustrating a glasses apparatus which provides audio data according to an exemplary embodiment. Referring to FIG. 14, a glasses apparatus 200 includes a first shutter glass 210, a second shutter glass 220, a shutter glasses driver 230, a controller 240, a communicator 250, an audio signal receiver 261, an audio signal processor 262, an audio outputter 263, an input receiver 270, and a storage 280.

Because operations of the first and the second shutter glasses 210 and 220 and the shutter glasses driver 230 have been described with reference to FIG. 13, a detailed explanation is omitted.

The input receiver 270 includes various kinds of keys in order to a user to control an operation of the glasses apparatus 200. Specifically, a power key, a pairing key, a content view change key, and a volume control key may be provided on the input receiver 270. These keys may be realized in various forms such as a push button, a dial, a jog shuttle, a wheel, and a touch pad.

The controller 240 may perform various control operations according to a manipulation state of the various kinds of keys provided on the input receiver 270. For example, if the power key is selected while the glasses apparatus is powered off, the controller 240 resumes the supply of power to each element from a battery (not shown) and performs a turn-on operation, and, if the power key is selected while the glasses apparatus is powered on, the controller 240 cuts off the power supply using a switch (not shown).

If the pairing key to perform pairing with a display apparatus is selected, the controller 240 controls the communicator 250 to perform pairing. Specifically, the controller 240 controls the communicator 250 to transmit a pairing trigger signal to the display apparatus. If address information of the display apparatus is received through the communicator 250, the controller 240 stores the address information in the storage 280. The communicator 250 performs communication connection with the display apparatus using the stored address information. The communicator 250 may use the address information obtained during the pairing process when performing communication reconnection. That is, if the power of the display apparatus which has been once turned off is turned on while the glasses apparatus 200 is connected to the display apparatus 100 for communication and is used, the controller 240 controls the communicator 250 to perform communication reconnection with the display apparatus using the address information stored in the storage 280.

The storage 280 may store various data such as a sync signal and information on a target content view received through the communicator 250, in addition to the address information received from the display apparatus. Also, the storage 280 may store various kinds of driving programs for driving the glasses apparatus.

The audio signal receiver 261 receives an audio signal that corresponds to a content view synchronized with the glasses apparatus from among a plurality of audio signals output from the display apparatus. As described above, if a multi-view function is performed, the display apparatus 100 detects audio data from each content and output the audio data through a different radio frequency channel. The audio signal receiver 261 tunes a radio frequency channel and receives an audio signal using radio frequency channel information corresponding to a content view selected by the controller 240. The radio frequency channel information may be included in the information on the target content view or the sync signal transmitted from the display apparatus 100, and may be transmitted along with the information on the target content view or the sync signal. Alternatively, the radio frequency channel information may be transmitted to the glasses apparatus 200 in a separate signal format.

The audio signal processor 262 processes the audio signal received by the audio signal receiver 261, and detects audio data. Specifically, the audio signal processor 262 may perform processing such as demodulation, noise filtering, and amplification.

The audio outputter 263 outputs the audio data processed by the audio signal processor 262. The audio outputter 263 may be realized by a speaker or an earphone. The audio outputter 263 may output the audio data at a volume level which is pre-set for the audio data. The volume level may be controlled using a variable resistance provided at an output end. That is, if a volume control key provided on the input receiver 270 is manipulated, the audio outputter 263 changes the volume level of the output audio signal (for example, the volume level may be changed by changing the value of a variable resistor according to the manipulation of the volume control key).

If a volume control command is input through the input receiver 270, the controller 240 controls the audio outputter 263 to control a volume of the audio data according to the volume control command. In this state, if a turn-off command to turn off the glasses apparatus is input through the input receiver 270, the controller 240 stores finally controlled volume information in the storage 280 before performing the turn-off operation.

After that, if a turn-on command to turn on the glasses apparatus is input through the input receiver 270, the controller 240 controls the communicator 250 to reconnect communication with the display apparatus 100. Also, the controller 240 controls the audio outputter 263 to control an output volume of the audio data based on the volume information stored in the storage 280. As a result, when communication reconnection is performed, the glasses apparatus 200 is synchronized with a target content view which displays an OSD message and is controllable by a remote controller, and outputs the audio signal at a volume level which is previously set.

On the other hand, if pairing with the display apparatus is achieved, the controller 240 may control the audio outputter 263 to control an initial volume of the audio data according to a volume level which is set as a default value in the display apparatus.

Figure 15:
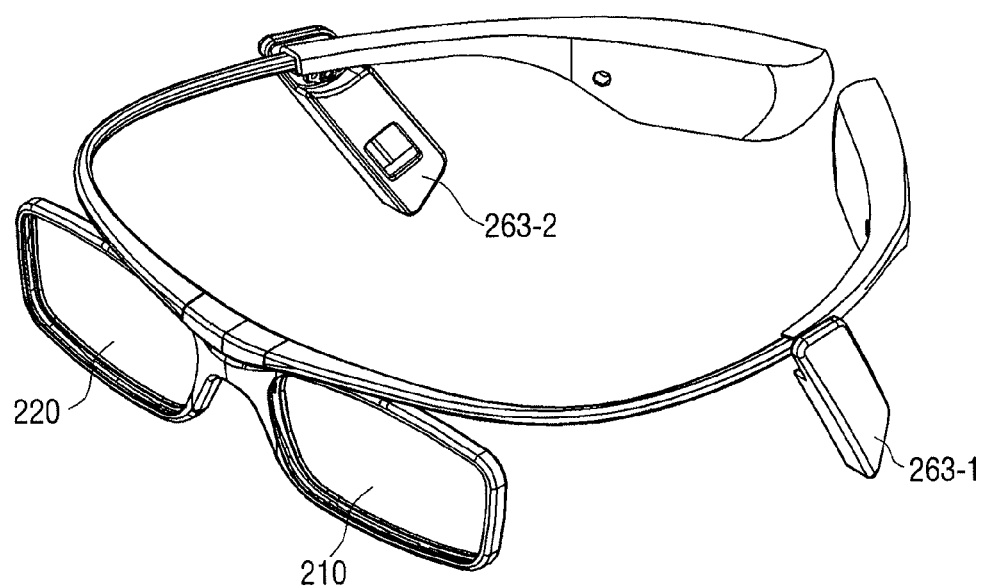
FIG. 15 is a view illustrating an example of an exterior of a glasses apparatus according to an exemplary embodiment.

FIG. 15 is a view illustrating an example of an exterior of the glasses apparatus 200 according to an exemplary embodiment. As shown in FIG. 15, the glasses apparatus 200 includes a glasses frame to support a plurality of shutter glasses 210 and 220, and a plurality of audio outputter 263-1 and 263-2 which are disposed on the glasses frame to be placed in proximity with user's ears.

Although the first and the second shutter glasses 210 and 220 are of a rectangular shape in FIG. 15, the first and the second shutter glasses 210 and 220 may have other shapes such as a circle or oval shape. Although the audio outputter 263-1 and 263-2 are realized in the form of a speaker in FIG. 15, the audio outputter 263-1 and 263-2 may be realized in the form of an earphone.

Figure 16:
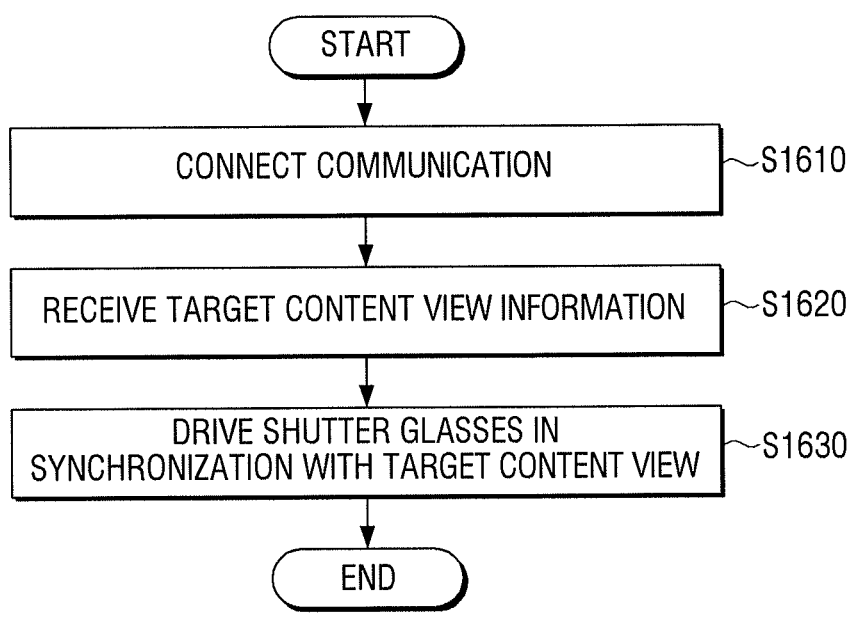
FIG. 16 is a flowchart illustrating a method for driving a glasses apparatus according to an exemplary embodiment.

FIG. 16 is a flowchart illustrating a method for driving a glasses apparatus according to an exemplary embodiment. Referring to FIG. 16, if communication connection with a display apparatus is established (S1610), the glasses apparatus receives information on a target content view (S1620). The communication connection may include communication reconnection besides pairing. The information on the target content view refers to information indicating a content view assigned remote control authority. Because the method for selecting a target content view has been described in the above-described exemplary embodiments in detail, a detailed explanation is omitted.

If the information on the target content view is received, the glasses apparatus is synchronized with the target content view based on the information on the target content view (S1630). That is, the glasses apparatus collectively opens left-eye and right-eye shutter glasses at a time when the target content view is output, and collectively closes the left-eye and the right-eye shutter glasses at a time when a different content view is output. Accordingly, a user who wears the glasses apparatus 200 can control the initial content view that the user sees using a remote controller. That is, the user may tune to a broadcast channel, display an OSD menu, and set a function displayed on the OSD menu.

If the contents displayed on the display apparatus is moving picture contents including audio data, the glasses apparatus should process an audio signal transmitted from the display apparatus.

Figure 17:
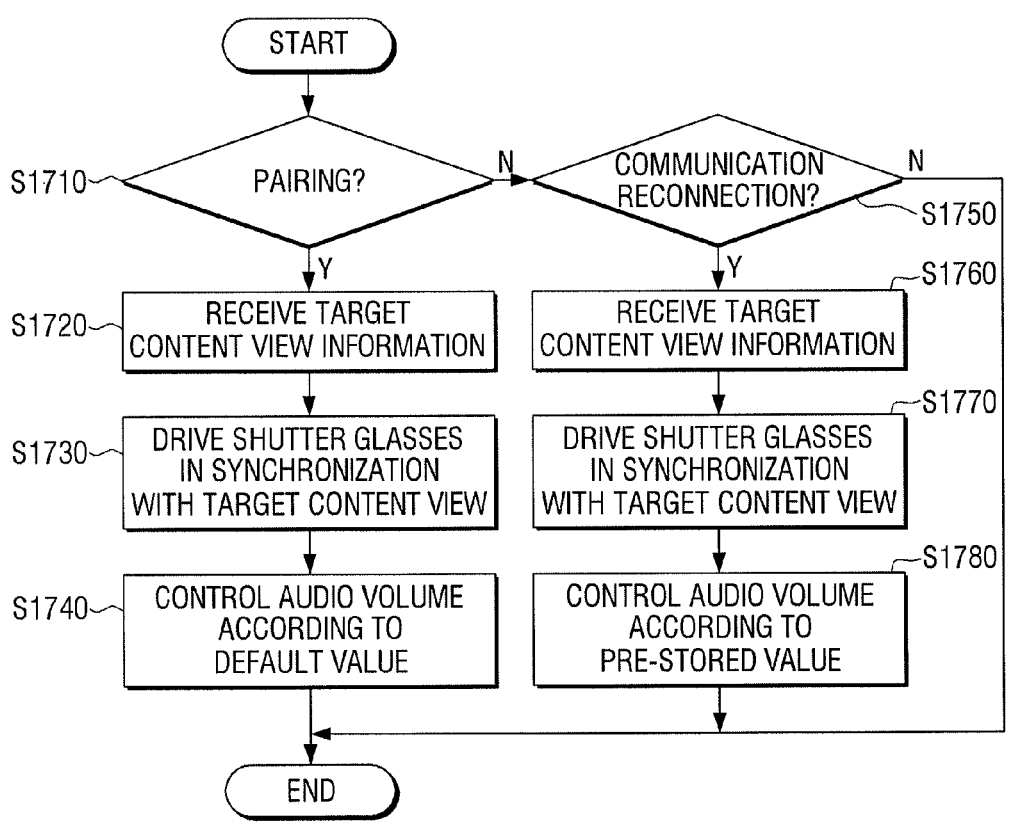
FIG. 17 is a flowchart illustrating a method for driving a glasses apparatus according to a communication connection condition with a display apparatus according to an exemplary embodiment.

FIG. 17 is a flowchart illustrating a method for driving a glasses apparatus which processes an audio signal according to an exemplary embodiment. Referring to FIG. 17, if pairing with a display apparatus is achieved (S1710), the glasses apparatus receives a target content view (S1720) and drives each shutter glass in synchronization with the target content view (S1730). The glasses apparatus outputs an audio signal at the same time of driving the shutter glasses. An output volume level of the audio signal is controlled based on a default value which is set in the display apparatus or the final output volume level which was set and stored in a previous multi-view mode (S1740).

If communication reconnection rather than pairing is established (S1750), the glasses apparatus is directly synchronized with the display apparatus using information on the target content view (S1760 and S1770), and controls the output volume using the volume level information previously controlled (S1780). That is, even if the user turns on the glasses apparatus again after having turned off the glasses apparatus, the user can listen to the audio signal at a previous volume level without having to control the volume separately.

As described above, according to the various exemplary embodiments, if the glasses apparatus is newly connected to the display apparatus in the state where the multi-view function to provide a plurality of content views is executed, the user can directly view the target content view which is assigned remote control authority from among the plurality of content views. Accordingly, the user who wears the new glasses apparatus may select a desired content or may select other various processing operations using the remote controller. As a result, user's convenience is improved.

The display apparatus 100 may operate in the above-mentioned multi-view mode by converting an operation mode in accordance with a user manipulation. For example, if a user manipulates a remote controller or a button provided on a body of the display apparatus 100, the display apparatus 100 displays a UI screen including various menus. The user may select a menu on the UI screen to convert an operation mode to a multi-view mode and select various options necessary to execute the multi-view mode so as to use the multi-view mode.

Figure 18:
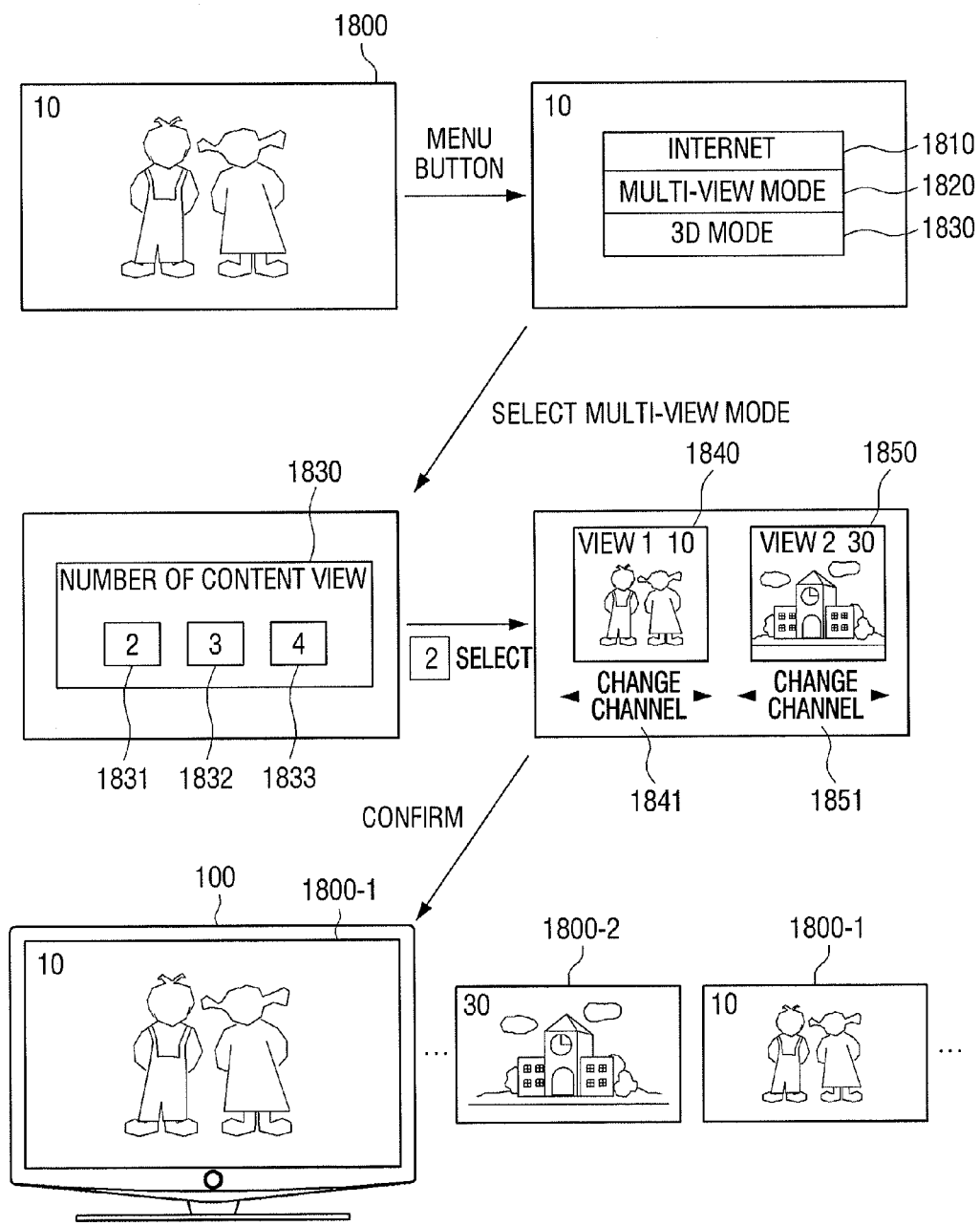
FIGS. 18 and 19 are views illustrating various examples of a screen configuration to initiate a multi-view mode in a display apparatus according to an exemplary embodiment.
Figure 19:
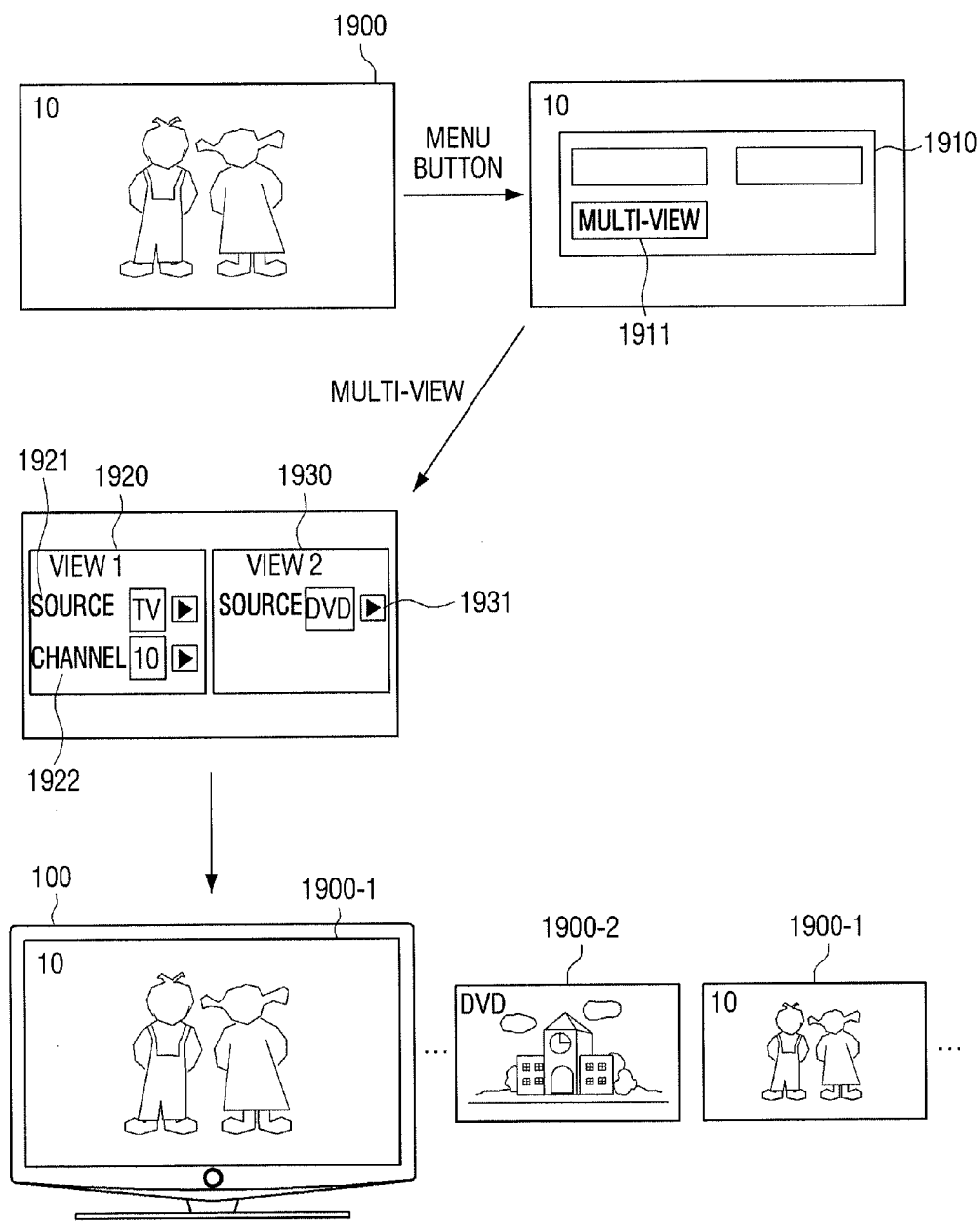

FIGS. 18 and 19 are views illustrating examples of a screen configuration of the display apparatus 100 according to various examples.

According to FIG. 18, if a user selects a menu button while the display apparatus 100 operates in a TV reception mode, and a TV broadcast channel screen 1800 (for example, channel 10) is being displayed, Graphic User Interface (GUI) menus 1810, 1820, 1830 are displayed on the screen 1800. The menus may include various menus such as a menu 1810 to connect to the Internet, a menu 1820 to operate in a multi-view mode, and a menu 1830 to operate in a 3D mode and so on. If the display apparatus 100 is realized in a configuration like the configuration illustrated in FIG. 10, the OSD processor 170 may display the menus 1810, 1820, 1830. The OSD processor 170 may be configured to include an operation unit (not shown), a rendering unit (not shown), and a buffering unit (not shown). The operation unit operates property values such as coordinates value, shape, size, and color which are to be displayed on each subject according to a layout of the corresponding screen based on layout data of the screen stored in the storage unit 183. The rendering unit generates menus 1810, 1820, 1830 based on the property values operated by the operation unit as illustrated in FIG. 18. The menu data generated by the rendering unit is stored in the buffering unit. The menu data stored in the buffering unit is displayed by the display unit 160.

A user may select one of the menus by touching the screen of the display apparatus 100 or manipulating a direction key and confirmation key provided on the body of the display apparatus.

If the multi-view mode 1820 is selected, the display apparatus 100 displays the UI 1830 to set the number of content views to be provided in the multi-view mode. For example, if it is possible to provide 2, 3, or 4 content views, as illustrated in FIG. 18, a menu 1831 to select a dual-view, a menu 1832 to select a triple-view, and a menu 1833 to select a quadruple-view may be displayed in the UI 1830.

If a user selects the menu 1831 to select a dual-view, preview screens 1840, 1850 for two content views may be displayed. The controller 120 may configure the preview screens 1840, 1850 using viewing history information stored in the storage unit 183. Specifically, the controller 120 may store information regarding contents provided by each content view or an input source of the contents in the storage unit 183 whenever a multi-view mode is terminated. Further, the controller 120 may also store information regarding applicable options when the corresponding content with respect to each content view is reproduced, such as volume, color, brightness, contrast, whether to display subtitles, language, and so on. If the multi-view mode is executed again later, the controller 120 controls the outputter 1000 to process a video signal and an audio signal using such information stored in the storage unit 183.

For example, as illustrated in FIG. 18, a screen which has been displayed at that time (that is, broadcast channel 10) is maintained on one screen 1840 from among preview screens and a screen provided from the same input source as the final input source selected in the previous multi-view mode is displayed on the other screen 1850. In FIG. 18, a broadcast signal screen received through the previous broadcast channel 30 is set to the second content view 1850 automatically.

A user may change a content matched with each content view or an input source while watching the preview screens 1840, 1850. The controller 120 may control the OSD processor 170 to display a guide image informing that a channel can be changed or menus 1841, 1851 to change channels on the lower part of the preview screens 1840, 1850. A user may change channels of each content view by touching the menus 1841, 1851 directly or using buttons of a remote controller.

If selection of a content matched with each content view or an input source is completed, a user may terminate the setting of multi-view mode operation by selecting a confirmation button on the body of the display apparatus 100. If the confirmation button is selected, the controller 120 controls the outputter 1000 to generate a plurality of content views in accordance with a setting value set through each UI. FIG. 18 illustrates a state in which the screen of broadcast channel 10 and a screen of broadcast channel 30 are provided through content views 1 and 2 (1800-1, 1800-2), respectively.

In FIG. 18, the multi-view mode using a TV input source has been explained, but the above-mentioned input source may be set not only as a TV but also as a recording medium reproduction apparatus such as a DVD and a Blue-ray reproduction apparatus. Accordingly, a menu to select an input source may also be included in a UI to set multi-view mode operation.

FIG. 19 illustrates an example of UI configuration including such menus. According to FIG. 19, if a menu button is selected while the display apparatus 100 displays a broadcast channel screen 1900, a UI 1910 including various available menus is displayed. Each menu may be configured and displayed in the form of icons or texts. If a user selects a multi-view mode menu 1911 in the UI 1910, the display apparatus 100 displays UIs 1920, 1930 through which an input source and a content can be selected with respect to each of a plurality of available content views.

In FIG. 19, it is assumed that the display apparatus 100 may support only two content views and the two UIs 1920, 1930 are displayed. However, even in the case where the display apparatus 100 may support more than two content views, a UI to select the number of content views is displayed first to receive a user selection as illustrated in FIG. 18.

In each UI 1920, 1930, source selection taps 1921, 1931 and a content selection tap 1922 in the corresponding source are displayed. In the case of DVD, only a source selection tap 1931 may be activated and displayed on the UI 1930 since further procedures such as selecting channels are not necessary, but in the case of TV or other external input sources for which content selection is necessary, the content selection tap 1922 may be activated and displayed.

In FIG. 19, a TV is selected as a source in the UI 1920 regarding the content view 1, and if broadcast channel 10 is selected from among the TV sources, a DVD is selected as a source in the UI 1930 regarding content view 2. Accordingly, an image of broadcast channel 10 is displayed on the first content view 1900-1 and a DVD play screen is displayed on the second content view 1900-2.

Meanwhile, the type of content and source which was selected in the previous multi-view mode may be displayed first on each UI 1920, 1930. A user may use the displayed type of source and content as they are, or may change the setting.

Figure 20:
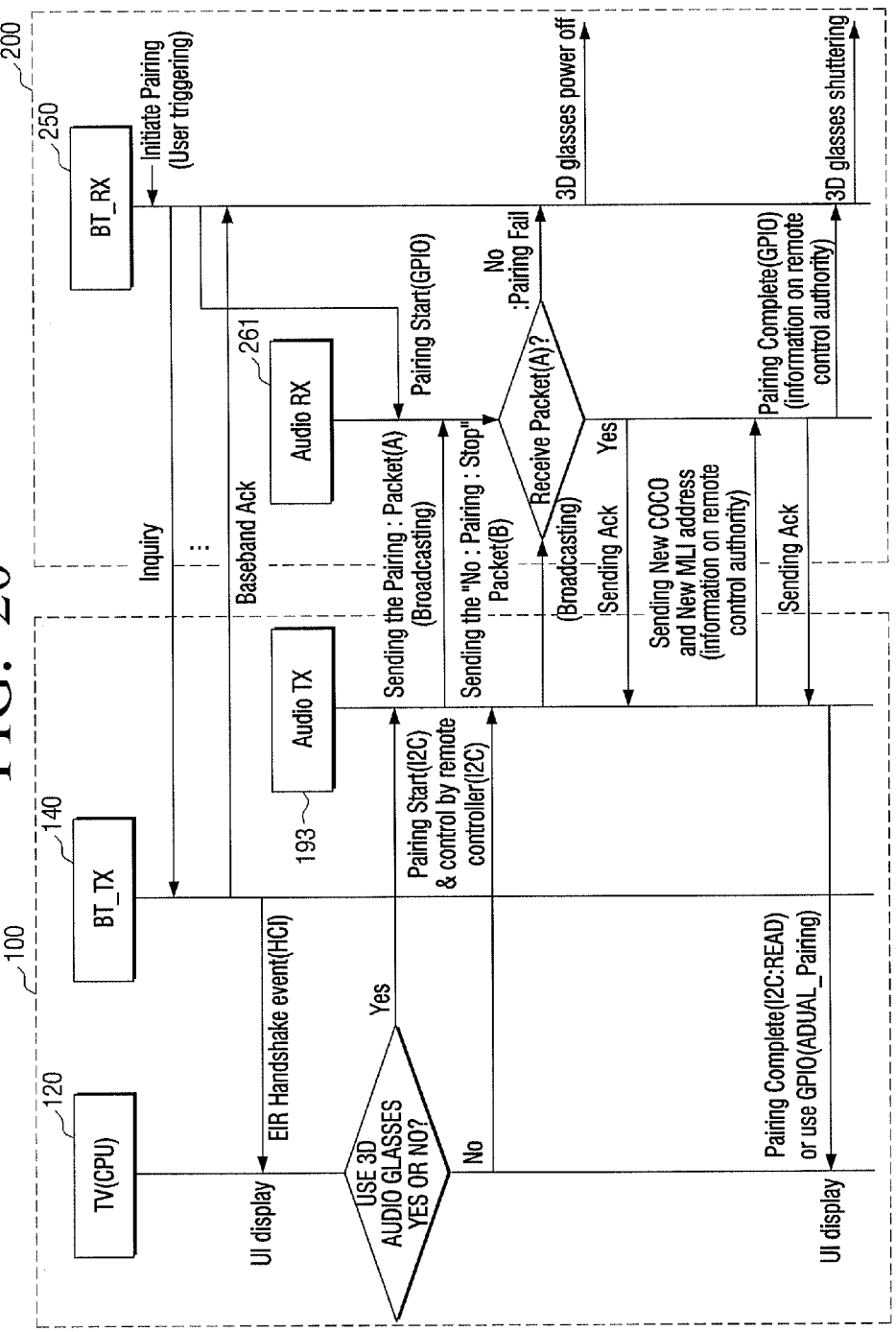
FIG. 20 is a view provided to explain an operation between a display apparatus and a glasses apparatus in detail.

As described above, a display apparatus provides information so that a glasses apparatus may be matched with a content view having remote control authority when it is paired or communication is resumed after being cut off. FIG. 20 is a timing view provided to explain the process of connecting a display apparatus with a glasses apparatus and the process of providing information in detail.

According to FIG. 20, the display apparatus 100 includes CPU, BT_TX, and Audio TX. CPU, BT_TX, and Audio TX are corresponding to the controller 120, the communicator 140, and the audio signal outputter 193 in the above exemplary embodiments, respectively. In addition, the glasses apparatus 200 includes BT_RX and Audio Rx. BT_RX and Audio Rx are corresponding to the communicator 250 and the audio signal receiver 261 in the glasses apparatus 200, respectively.

According to FIG. 20, if a user presses a pairing button in a glasses apparatus, a pairing is initiated. Accordingly, BT_RX 250 transmits an inquiry to BT_TX 140. The BT_RX 250 and the BT_TX 140 performs predetermined processes (such as, baseband ack) sequentially according to standard.

Meanwhile, the BT_RX 250 transmits a pairing start signal (GPIO) to Audio Rx 261. The Audio Rx 261 is activated by the signal.

On the other hand, the BT_TX 140 notifies the CPU 120 of EIR Handshake event (HCI). The CPU 120 selects whether to user 3D audio glasses according to the notification. To be specific, a UI may be displayed to inquiry about whether to use 3D audio glasses in order to receive a user selection.

If it is determined that glasses are to be used, the CPU 120 transmits signals for starting pairing and remote control to the Audio Tx 193. If the corresponding signal is received, the Audio Tx 193 broadcasts a packet A for pairing. Alternatively, if it is determined that the glasses are not to be used, the Audio Tx 193 broadcasts a packet B to stop pairing.

If the packet A is not received within a predetermined time period or the packet B is received, the Audio Rx 261 notifies the BT-Rx 250 that pairing is not succeeded. On the other hand, if the packet A is received, the Audio Rx 261 transmits acknowledgement to the Audio Tx 193.

If the acknowledgement is received, the Audio Tx 193 transmits information regarding content views for which remote control is available, that is, information regarding target content views to the Audio Rx 261 and subsequently, the Audio Rx 261 sends acknowledgement. If the acknowledgement is received, the Audio Tx 193 transmits a pairing completion signal to the CPU 120.

After receiving the acknowledgement, the Audio Rx 261 transmits a pairing completion signal including information regarding target content views to the BT-Rx 250. The BT-Rx 250 provides information regarding target content views to the controller 240, and the controller 240 controls the shutter driver 230 to synchronize with the target content views immediately. Through these processes, pairing and initial synchronization may be performed.

FIG. 20 illustrates that the communicator 250 and the audio signal receiver 261 performs all of the above-described operations in the glasses apparatus 200, but the controller 240 may involve in some of the operations.

Figure 21:
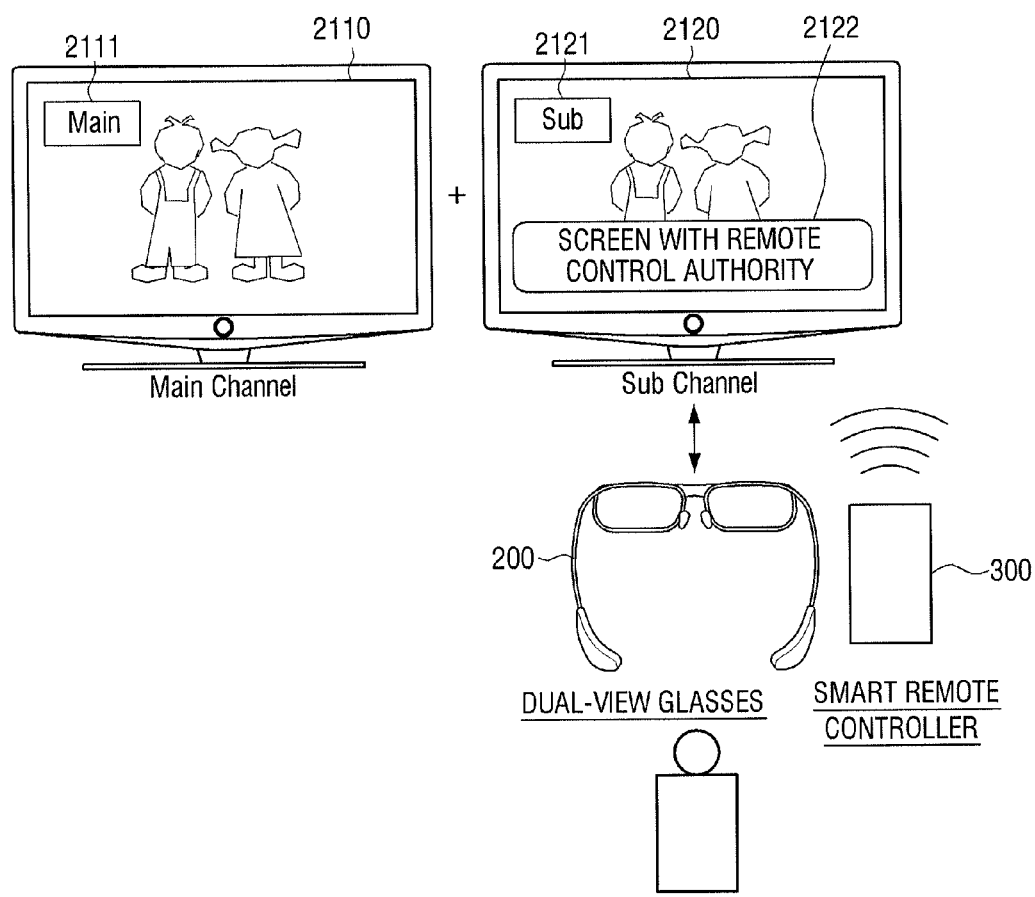
FIGS. 21 and 22 are views provided to explain examples of an operation when a glasses apparatus is paired to a display apparatus.

FIG. 21 illustrate an example of configuration of a display screen which can be watched through a glasses apparatus when pairing is completed in the same way as FIG. 20.

FIG. 21 illustrates a case in which a first content view 2110 and a second content view 2120 are being provided and the second content view 2120 is a target content view. In this case, the first content view 2110 may be regarded as a main screen, and the second content view 2120 may be regarded as a sub screen.

In this state, if the glasses apparatus 200 is newly paired, the glasses apparatus 200 is directly synchronized with the second content view 2120 which has remote control authority. If the new glasses apparatus 200 is connected through pairing, OSDs 2111, 2121 indicating a screen type may be displayed on each content view 2110, 2120. In addition, an OSD 2122 indicating that the second content view 2120 has remote control authority may be displayed on the second content view 2120, a target content view for which remote control is available. Accordingly, a user wearing the glasses apparatus 200 may immediately aware that an initially-displayed screen is a sub screen and remote control is available.

Meanwhile, the above exemplary embodiments have explained a case in which, if a glasses apparatus is initially paired or reconnected after its communication is cut off, the glasses apparatus is immediately synchronized with a content view with remote control authority, regardless of a user's intention, but in another exemplary embodiment, a user may select a screen.

Figure 22:
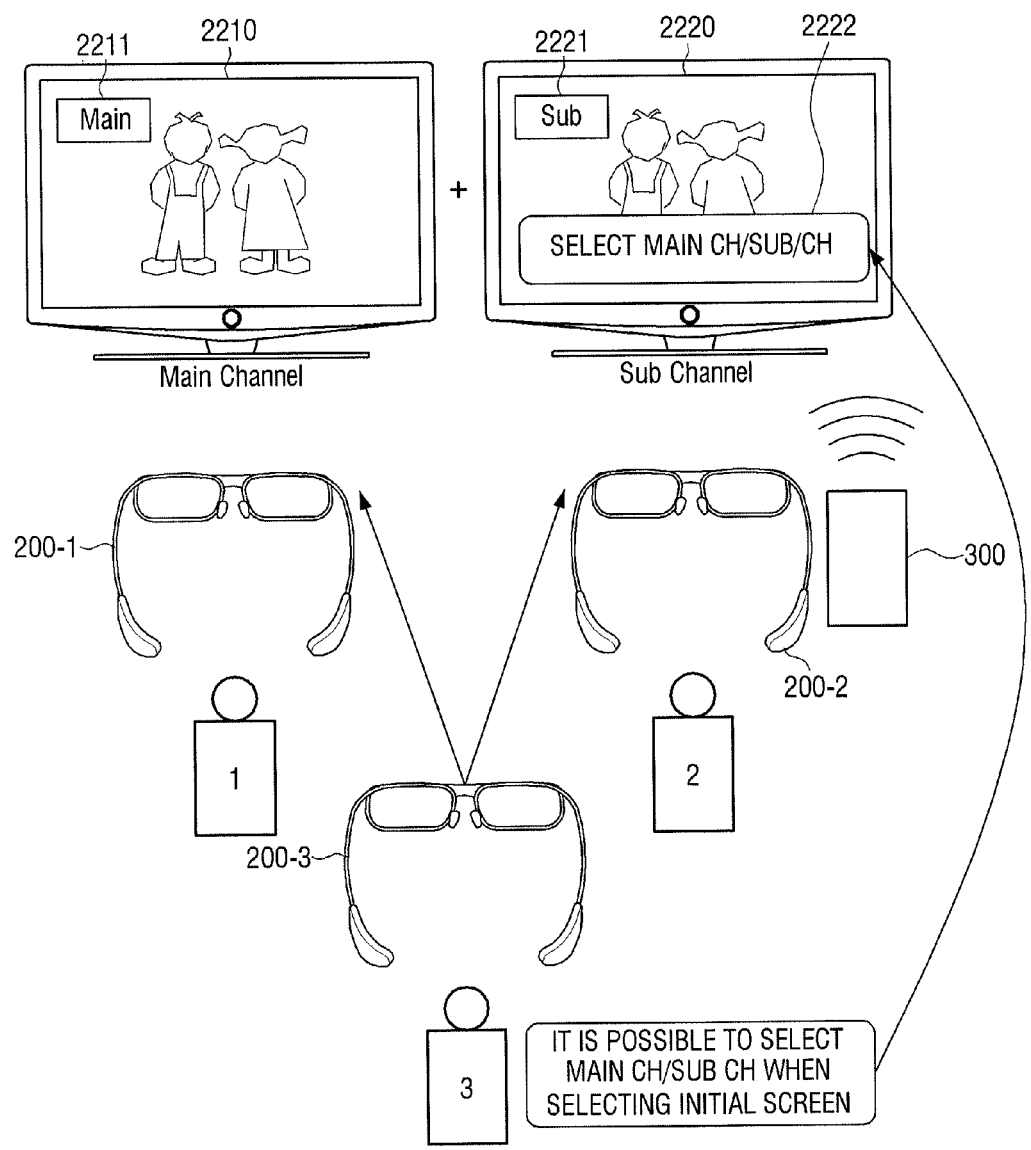

FIG. 22 is a view provided to explain a display apparatus and an operation of a glasses apparatus according to another exemplary embodiment.

According to FIG. 22, the first glasses apparatus 200-1 is matched with the first content view 2210 and the second glasses apparatus 200-2 is matched with the second content view 2220 while the first and second content views 2210, 2220 are displayed alternately. In addition, the second content view 2220 is selected as a content view which is controllable by the remote controller 300, that is, a target content view. In this state, if a new glasses apparatus, that is the third glasses apparatus 200-3 is connected, the third glasses apparatus 200-3 is immediately matched with the second content view 2220.

In this case, an OSD message 2211 representing that a main channel is displayed on the first content view 2210, and an OSD message 2221 representing a sub channel and an OSD message 2222 for selecting a main channel or a sub channel are displayed on the second content view 2220. A user may select a main channel or a sub channel with reference to the OSD message 2222.

FIG. 22 illustrates a case where the OSD message 2222 is displayed only one screen 2220 having remote control authority, but, otherwise, the OSD message 2222 may be displayed both on the first and second content views 2210, 2220. In addition, regardless of remote control authority, the OSD message 2222 may be displayed on only one content view which is set as default.

As described above, a display apparatus may provide a plurality of contents in various ways.

The multi-view display method of the display apparatus or the methods for driving the glasses apparatus according to the above-described various exemplary embodiments may be generated as software executed by a hardware processor and may be mounted in a non-transitory computer readable storage medium in the display apparatus and/or the glasses apparatus.

Specifically, according to an exemplary embodiment, a non-transitory computer readable medium, which stores a program for performing: alternately displaying a plurality of content views, transmitting a sync signal regarding the plurality of contents views to at least one glasses apparatus, identifying a target content view that is controllable by a remote controller from among the plurality of content views if communication connection between a new glasses apparatus and the display apparatus is established, and transmitting information on the target content view to the new glasses apparatus so that the new glasses apparatus is synchronized with the target content view, may be installed in the display apparatus.

Also, a non-transitory computer readable medium, which stores a program for performing: connecting communication with a display apparatus which alternately displays a plurality of content views, receiving information on a target content view which is controllable by a remote controller from among the plurality of content views, and driving first and second shutter glasses in synchronization with the target content view, may be installed in the glasses apparatus.

The non-transitory computer readable medium may refer to a medium that stores data temporarily, semi-permanently, or permanently (for example, a register, a cache, a memory, etc.) and is readable by an apparatus. Specifically, the above-described various applications or programs may be stored in a non-transitory computer readable medium such as a compact disk (CD), a digital video disk (DVD), a hard disk, a Blueray disk, a universal serial bus (USB), a memory card, a read-only memory (ROM), etc.

The foregoing exemplary embodiments and advantages are merely exemplary and are not to be construed as limiting the present disclosure. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a video processor which, in a multi-view mode, processes a plurality of contents and generates a plurality of content views;
a display which displays the plurality of content views;
a sync signal generator which generates a sync signal regarding the plurality of content views;
a communicator which transmits the sync signal; and
a controller which, if a communication connection with a glasses apparatus is established, transmits information on a target content view which is controllable from among the plurality of content views to the glasses apparatus,
wherein the sync signal is divided into a plurality of sync periods such that each of the plurality of sync periods is divided by a rising edge or a falling edge of a pulse indicating synchronization information.

2. The display apparatus as claimed in claim 1, further comprising:
an on-screen display (OSD) processor which displays an OSD message informing a connection state of the glasses apparatus on the target content view; and
a remote control signal receiver which receives a remote control signal,
wherein the controller processes the target content view according to the remote control signal.

3. The display apparatus as claimed in claim 2, further comprising:

an audio processor which generates a plurality of audio signals corresponding to the plurality of content views; and
an audio signal outputter which outputs the plurality of audio signals through different channels,
wherein the controller equally sets a volume level of the plurality of audio signals as a default value.

4. The display apparatus as claimed in claim 1, wherein the communicator:
transmits address information of the display apparatus in response to a pairing trigger signal received from the glasses apparatus; and
transmits information on the target content view to the glasses apparatus if a response signal corresponding to the address information is received from the glasses apparatus.

5. The display apparatus as claimed in claim 1, further comprising a storage which stores information on each of the contents which are displayed on the plurality of content views,
wherein, if the multi-view mode is executed after having been terminated, the controller selects the contents again using the information stored in the storage from the previously executed multi-view mode, and controls the video processor to process the selected contents and provide the plurality of content views.

6. The display apparatus as claimed in claim 1, wherein the target content view is a content view controllable by a remote external apparatus and wherein the remaining content views are not controllable.

7. The display apparatus as claimed in claim 1, wherein the target content view is a content view controllable by a remote external apparatus such that contents depicted in the target content view are changeable by manipulating a remote external apparatus and wherein only the target content view from the plurality of content views is controllable.

8. The display apparatus as claimed in claim 1, wherein the plurality of content views comprise a first content view, which is the target content view, and a second content view and wherein the controller is further configured to change the target content view to the second content view such that the second content view is controllable instead of the first content view.

9. The display apparatus as claimed in claim 1, wherein the target content view has an external apparatus authority such that the external apparatus can manipulate the target content view and wherein the sync signal is one signal comprising a reference clock information and synchronization information indicating a time at which each respective content view of the plurality of content views is displayed with reference to the reference clock.

10. The display apparatus as claimed in claim 1, further comprising an input interface configured to receive input to set a number of content views for the video processor to generate.

11. The display apparatus as claimed in claim 1, wherein each of the plurality of content views is adjustable with respect to displayed contents therein only if the respective content view is set as the target content view.

12. The display apparatus as claimed in claim 1, wherein only the target content view of the plurality of content views is controllable such that at least one of displayed contents therein and attributes related to the target content view are modifiable.

13. A glasses apparatus which is paired with a display apparatus which displays a plurality of content views, the glasses apparatus comprising:

first and second shutter glasses;
a shutter glasses driver which independently drives each of the first and the second shutter glasses;
a communicator which, if a communication connection with the display apparatus is established, receives a sync signal including synchronization information on each of the plurality of content views and information on a target content view which is a view that is controllable with respect to at least one of contents depicted therein and attributes of the target content view, and
a controller which selects synchronization information corresponding to a target content view from among the plurality of content views according to the information on the target content view and controls the shutter glasses driver to drive the first and the second shutter glasses using the selected synchronization information,
wherein the sync signal is divided into a plurality of sync periods such that each of the plurality of sync periods is divided by a rising edge or a falling edge of a pulse indicating synchronization information.

14. The glasses apparatus as claimed in claim 13, further comprising:
an audio signal receiver which receives an audio signal corresponding to a content view synchronized with the glasses apparatus from among a plurality of audio signals output from the display apparatus;
an audio signal processor which processes the received audio signal and detects audio data; and
an audio outputter which outputs the audio data.

15. The glasses apparatus as claimed in claim 14, further comprising:
an input receiver which receives a user command; and
a storage,
wherein the controller controls the audio outputter to control a volume of the audio data in response to a volume control command input through the input receiver, and stores a final volume information in the storage and performs a turn-off operation in response to a turn off command input through the input receiver.

16. The glasses apparatus as claimed in claim 15, wherein the controller controls the communicator to re-connect communication with the display apparatus and controls the audio outputter to control an output volume of the audio data based on the final volume information stored in the storage in response to a turn on command input through the input receiver.

17. The glasses apparatus as claimed in claim 16, wherein the controller controls the audio outputter to control the volume of the audio data according to a volume level which is set as a default value in the display apparatus.

18. The glasses apparatus as claimed in claim 15, wherein the controller controls the communicator to transmit a pairing trigger signal to the display apparatus in response to a pairing command input through the input receiver, stores address information received from the display apparatus in the storage, and controls the communicator to communicate with the display apparatus using the address information,
wherein, if the display apparatus is turned on after having been turned off, the controller controls the communicator to reconnect communication with the display apparatus using the address information stored in the storage.

19. A multi-view display method of a display apparatus, the method comprising:
displaying a plurality of content views;
generating and transmitting a sync signal regarding the plurality of content views;
determining a target content view from among the plurality of content views; and
transmitting information on the target content view to the glasses apparatus to synchronize the glasses apparatus with the target content view,
wherein the target content view is a view that is controllable with respect to at least one of contents depicted therein and attributes of the target content view,
wherein the sync signal is divided into a plurality of sync periods such that each of the plurality of sync periods is divided by a rising edge or a falling edge of a pulse indicating synchronization information.

20. The method as claimed in claim 19, further comprising:
if communication between the glasses apparatus and the display apparatus is connected, displaying an on-screen display (OSD) message informing a connection status of the glasses apparatus on the target content view.

21. The method as claimed in claim 20, further comprising:
generating a plurality of audio signals corresponding to the plurality of content views; and
outputting the plurality of audio signals through different channels,
wherein a volume level of the plurality of audio signals is equally set as a default value.

22. The method as claimed in claim 19, wherein the plurality of content views are selected based on information stored during a previous multi-view mode.

23. A method for driving a glasses apparatus which comprises first and second shutter glasses, the method comprising:
communicating with a display apparatus which displays a plurality of content views;
receiving a sync signal including synchronization information on each of the plurality of content views and information on a target content view;
selecting synchronization information corresponding to a target content view from among the plurality of content views according to the information on the target content view; and
driving the first and the second shutter glasses using the selected synchronization information,
wherein the target content view is a view that is controllable with respect to at least one of contents depicted therein and attributes of the target content view,
wherein the sync signal is divided into a plurality of sync periods such that each of the plurality of sync periods is divided by a rising edge or a falling edge of a pulse indicating synchronization information.

24. The method as claimed in claim 23, further comprising:
receiving an audio signal corresponding to a target content view synchronized with the glasses apparatus from among a plurality of audio signals output from the display apparatus;
processing the received audio signal and detecting audio data; and
outputting the audio data.

25. The method as claimed in claim 24, further comprising:
controlling a volume of the audio data in response to a volume control command;
storing final volume information and performing a turn-off operation in response to a turn off command;
reconnecting communication with the display apparatus using pre-stored address information in response to a turn on command; and
controlling an output volume of the audio data based on the stored final volume information.

26. The method as claimed in claim 24, further comprising:
 controlling the volume of the audio data according to a volume level which is set as a default value in the display apparatus.

27. The method as claimed in claim 23, wherein the communicating with the display apparatus comprises:
 transmitting a pairing trigger signal to the display apparatus in response to a pairing command;
 storing address information received from the display apparatus; and
 transmitting a response signal to the display apparatus using the address information.

* * * * *